Figure 1:
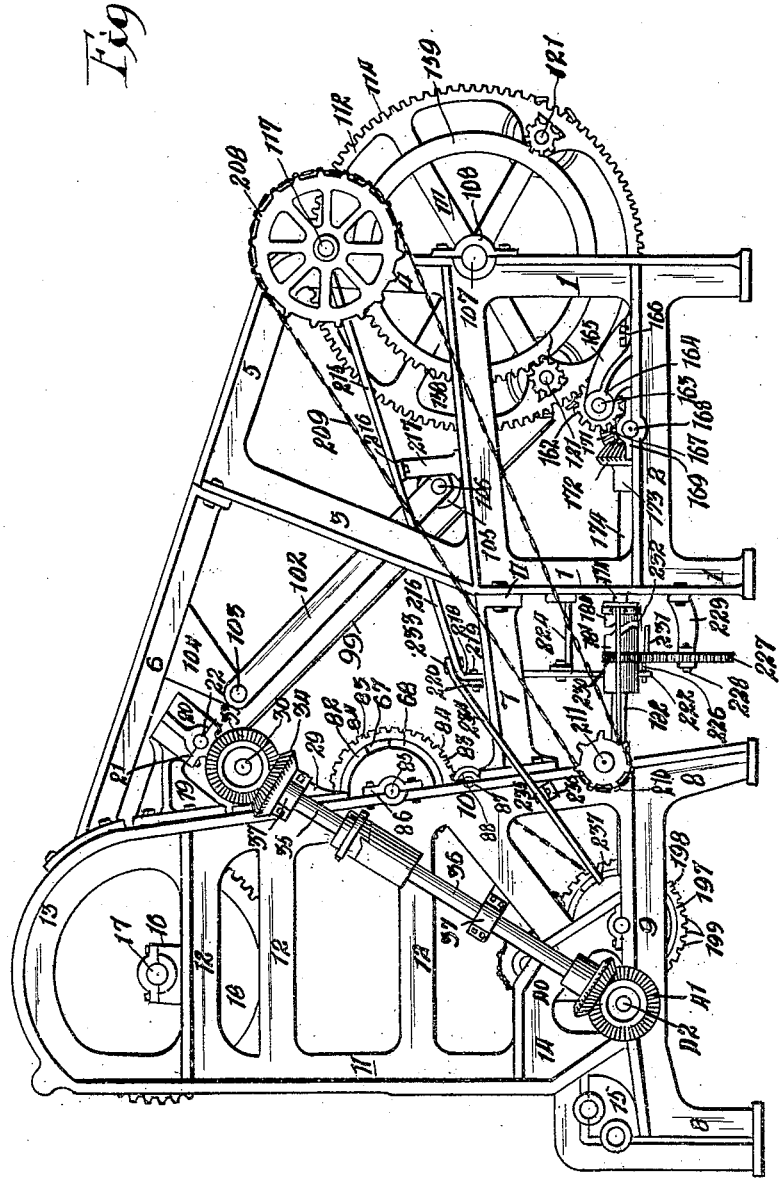

J. M. DENNING.
MACHINE FOR REELING AND CUTTING OFF WIRE FENCING.
APPLICATION FILED AUG. 31, 1907.

955,584.

Patented Apr. 19, 1910.
11 SHEETS—SHEET 1.

Witnesses:
Wm P. Bond
Pierson W. Banning.

Inventor:
Joseph M. Denning
by Banning & Banning
Attys.

J. M. DENNING.
MACHINE FOR REELING AND CUTTING OFF WIRE FENCING.
APPLICATION FILED AUG. 31, 1907.
955,584.
Patented Apr. 19, 1910.
11 SHEETS—SHEET 2.
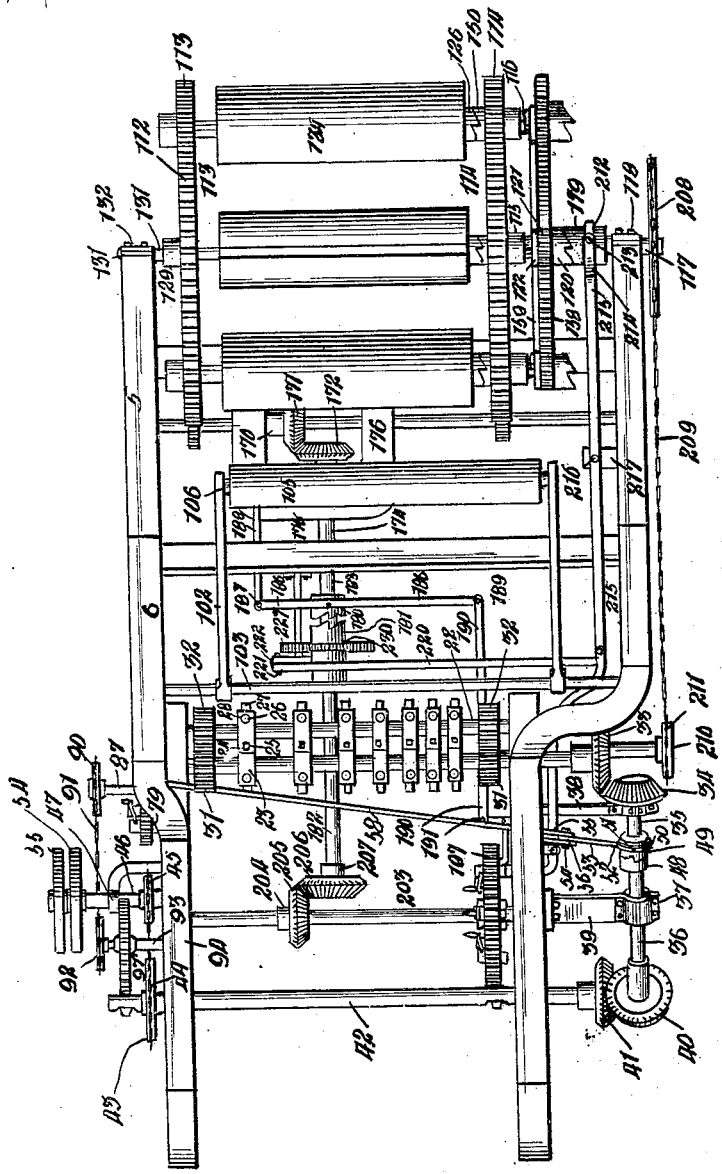
Witnesses
Inventor:

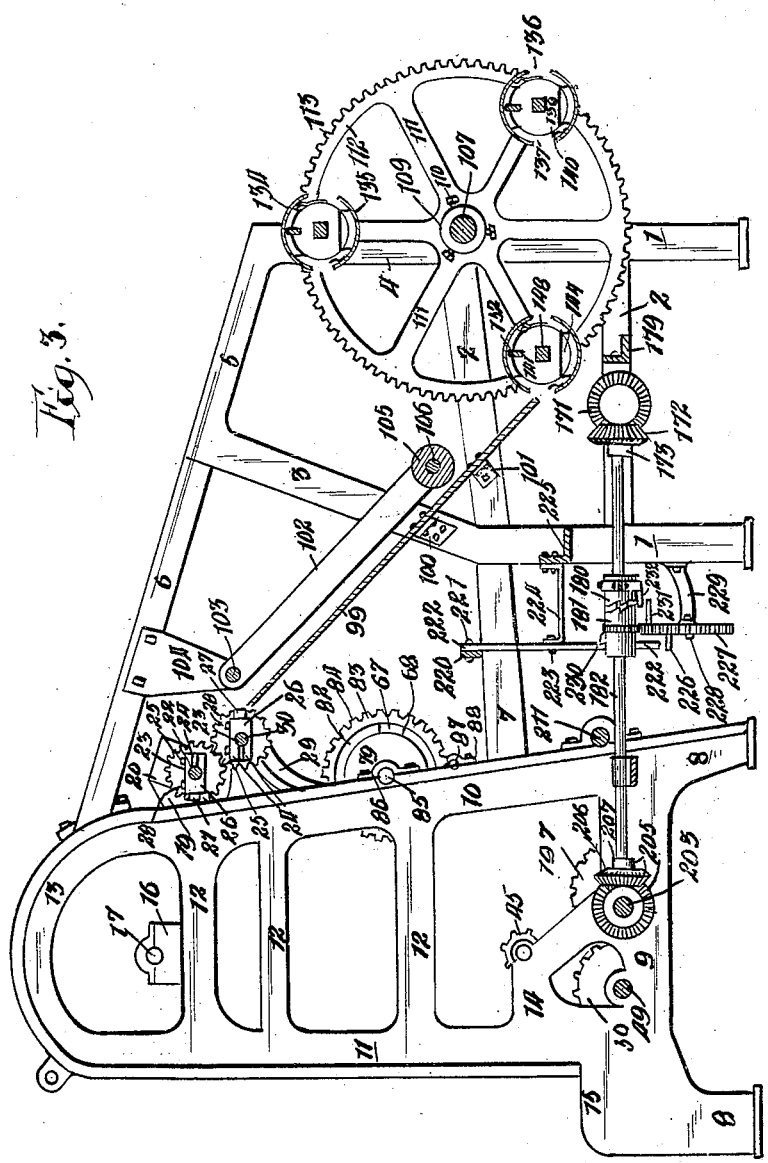

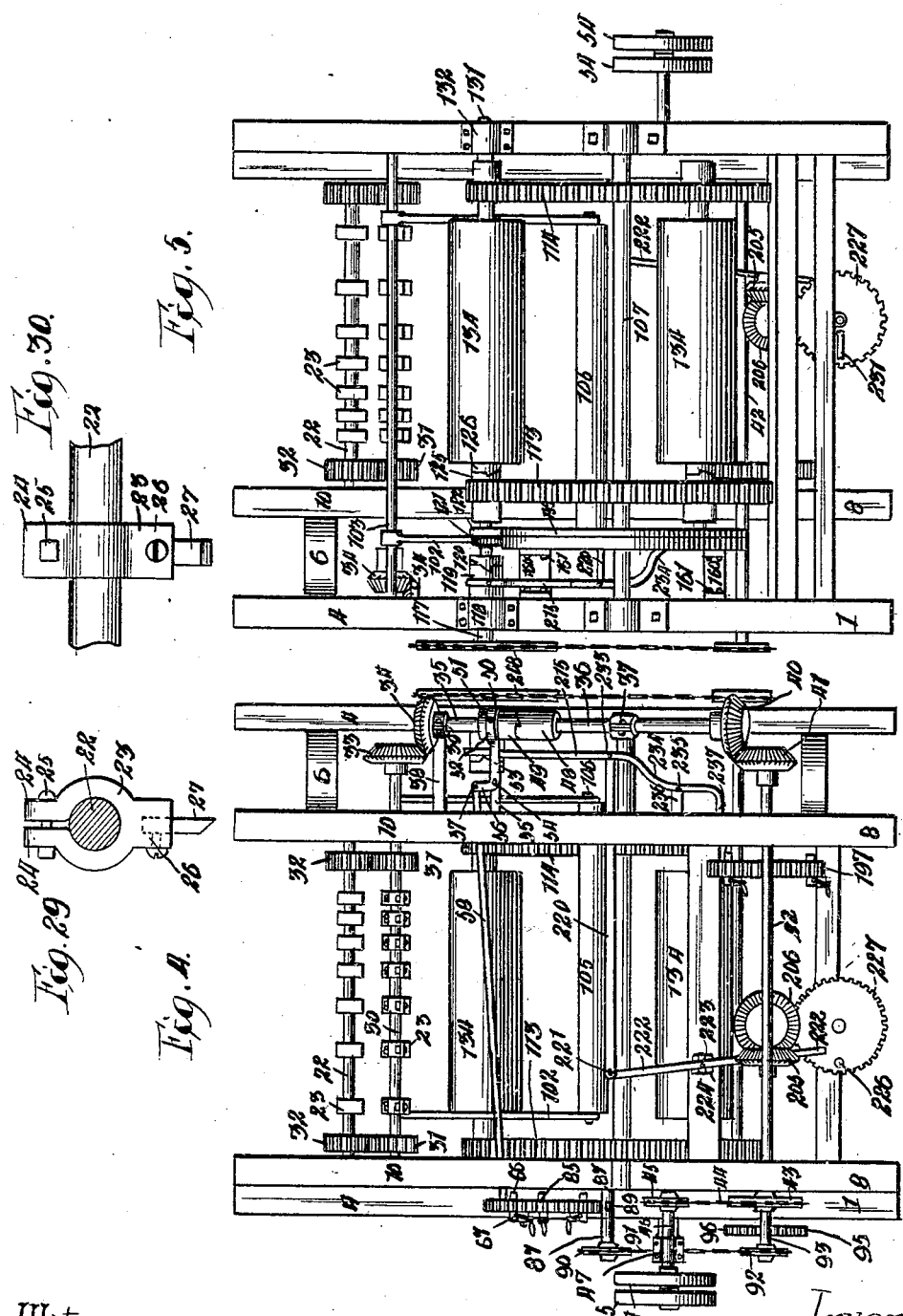

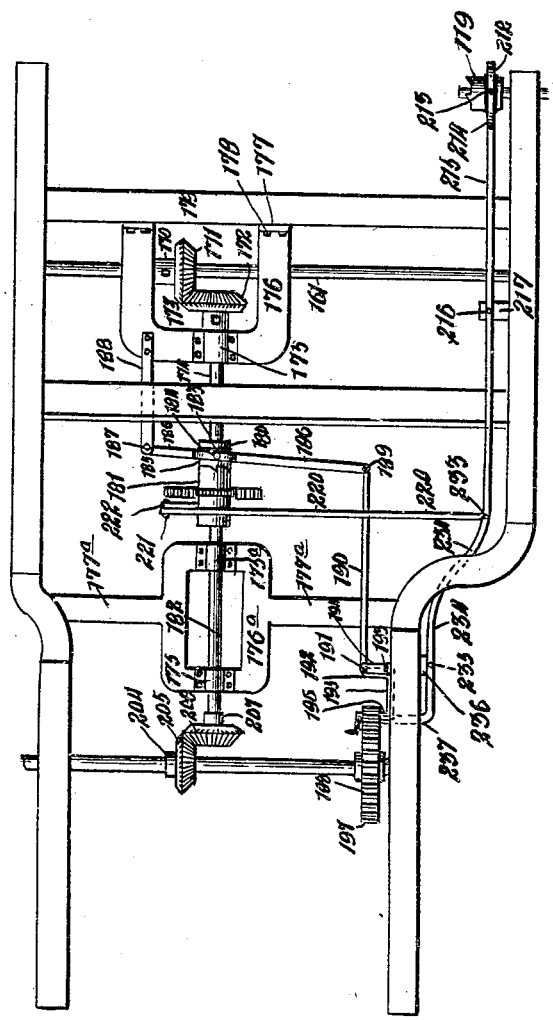

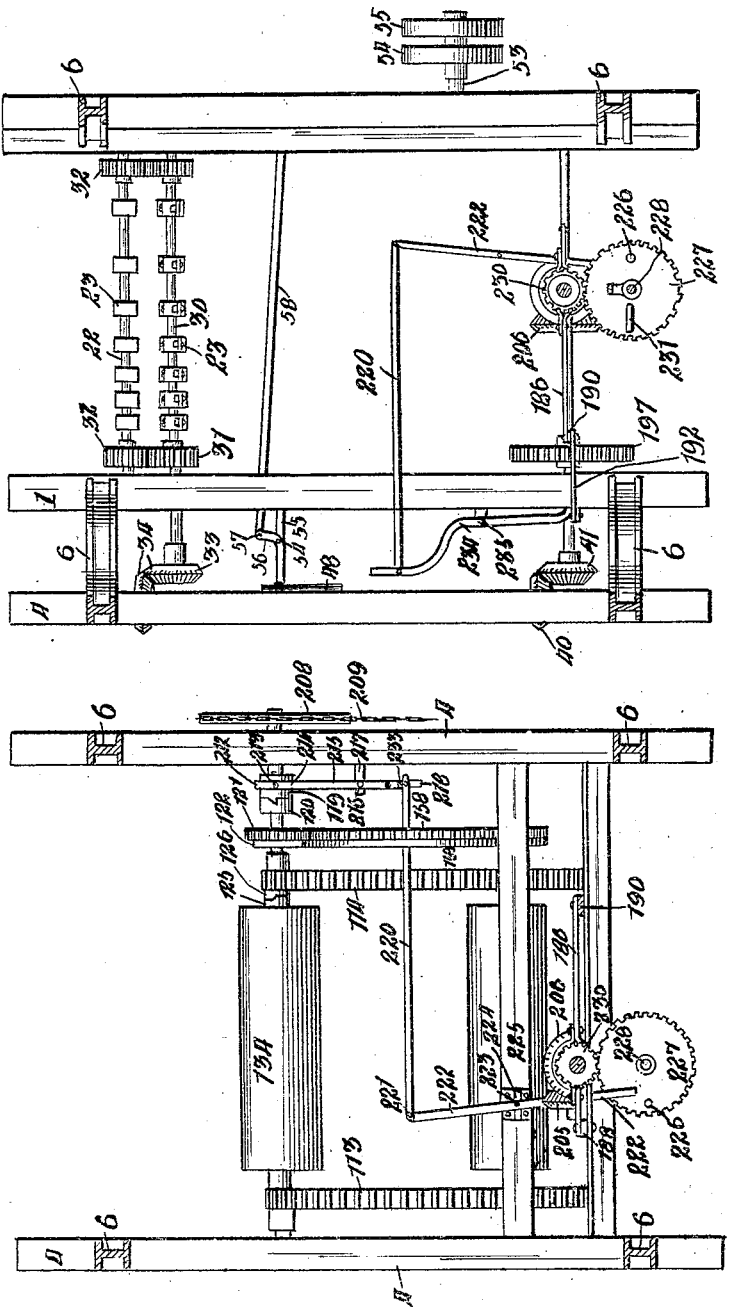

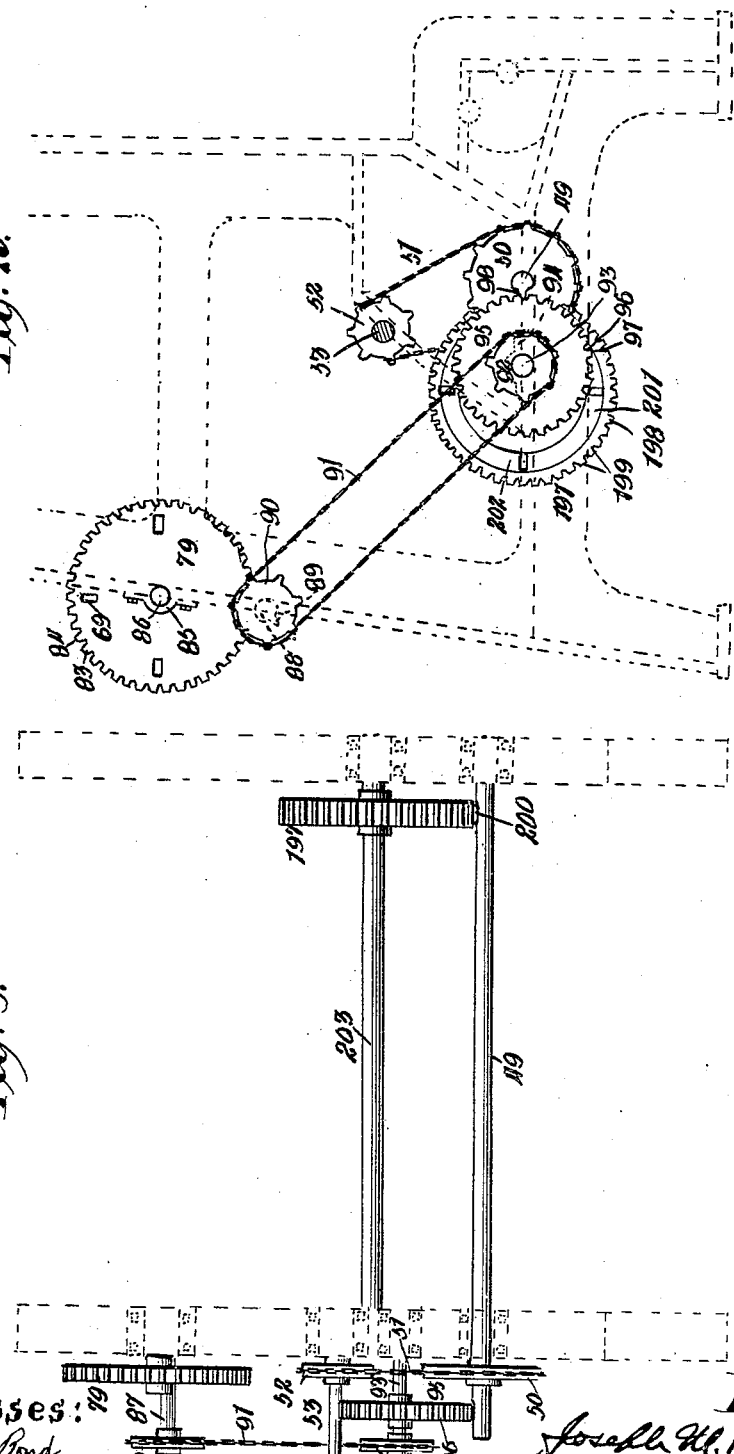

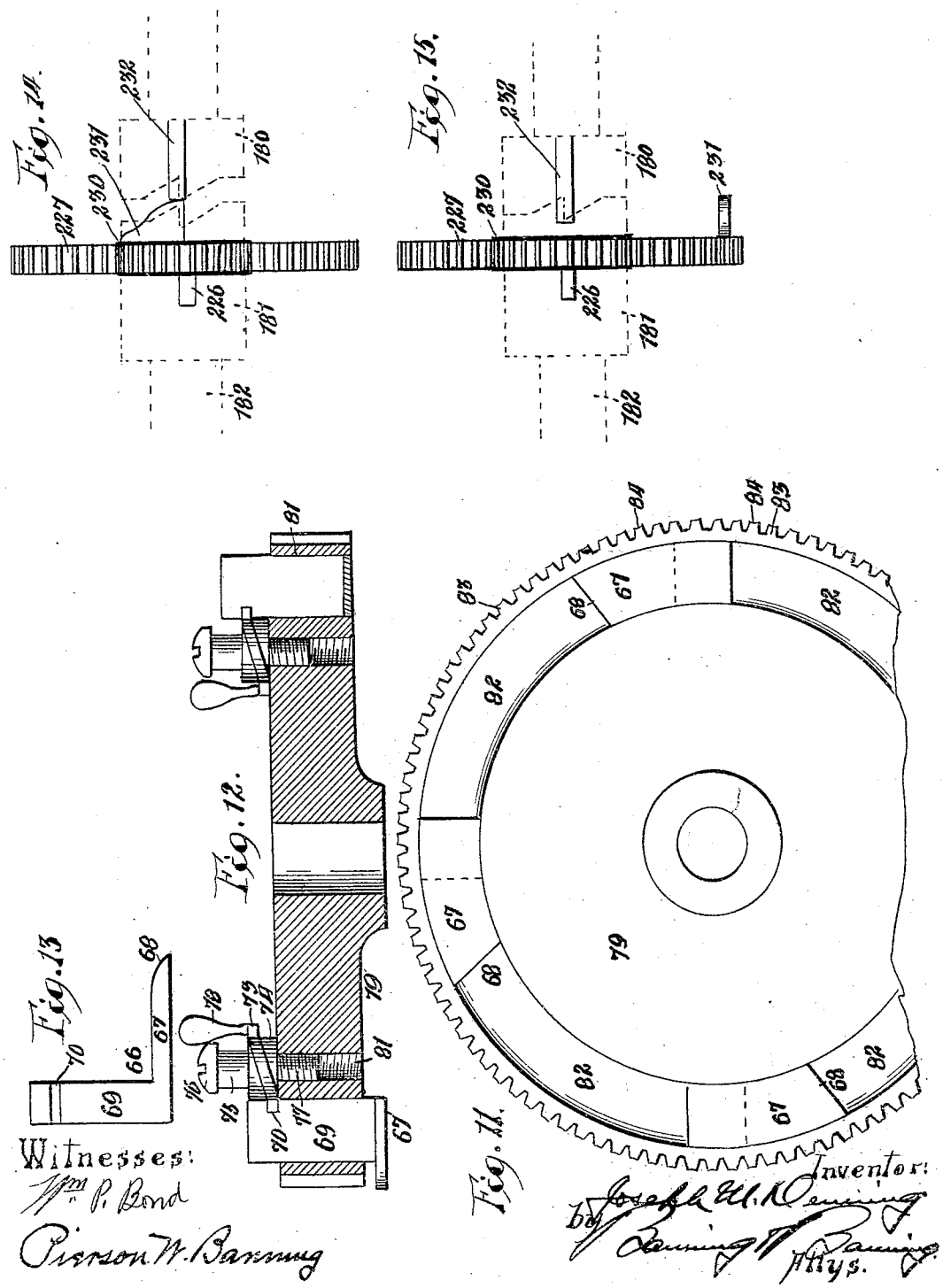

J. M. DENNING.
MACHINE FOR REELING AND CUTTING OFF WIRE FENCING.
APPLICATION FILED AUG. 31, 1907.
955,584.
Patented Apr. 19, 1910.
11 SHEETS—SHEET 9.
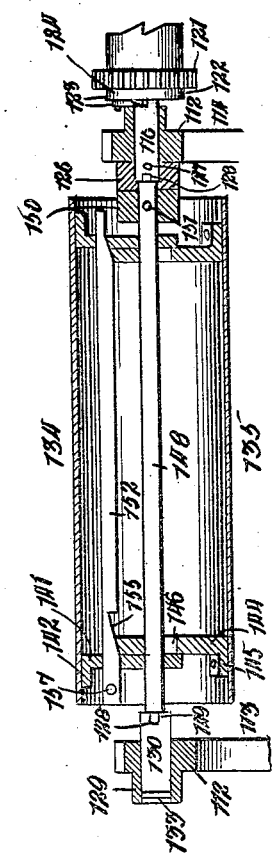
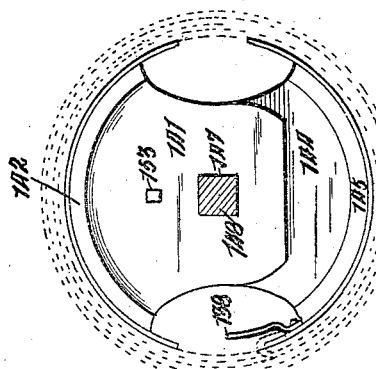
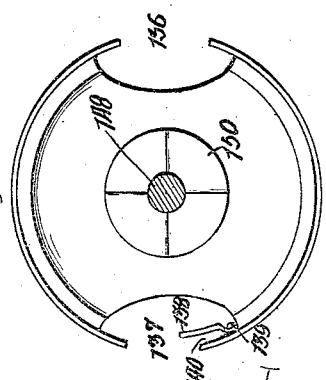
Witnesses:
Inventor:

J. M. DENNING.
MACHINE FOR REELING AND CUTTING OFF WIRE FENCING.
APPLICATION FILED AUG. 31, 1907.
955,584.
Patented Apr. 19, 1910.
11 SHEETS—SHEET 10.
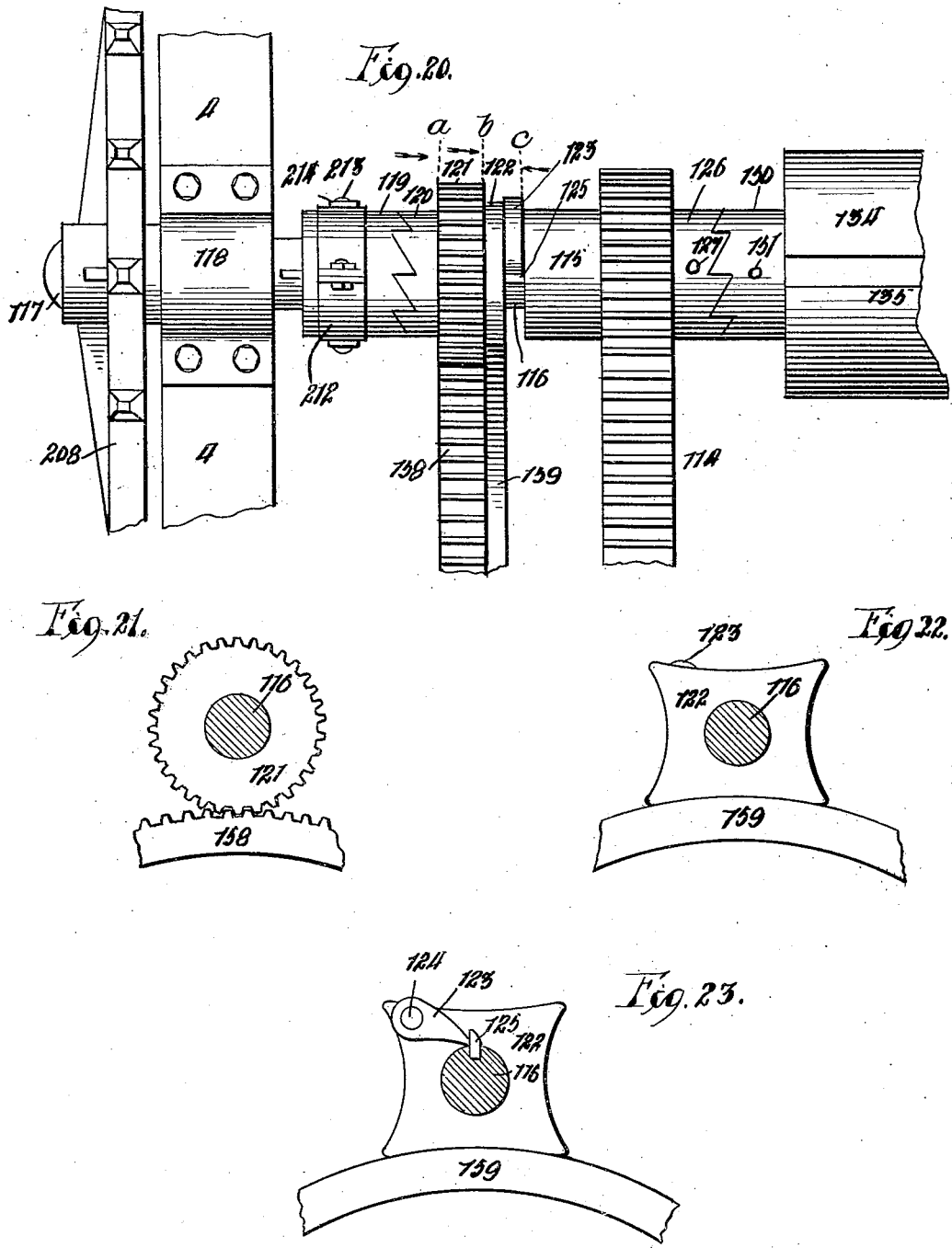
Witnesses
Wm P. Bond
Pierson W. Banning.
Inventor:
Joseph M. Denning
by Banning & Banning
Attys.

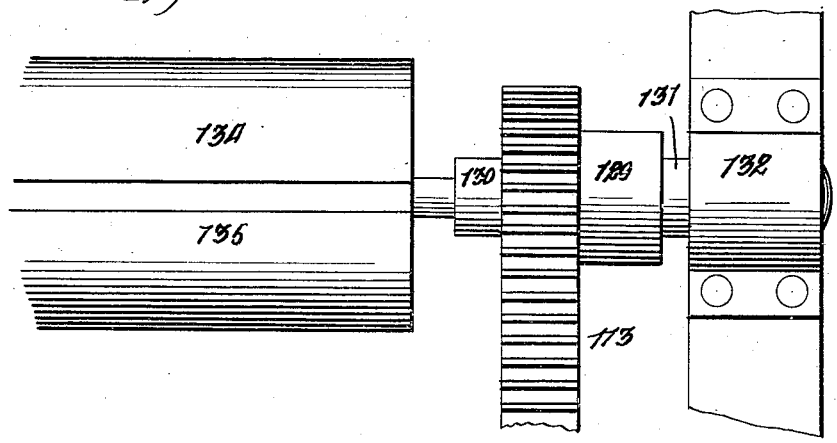
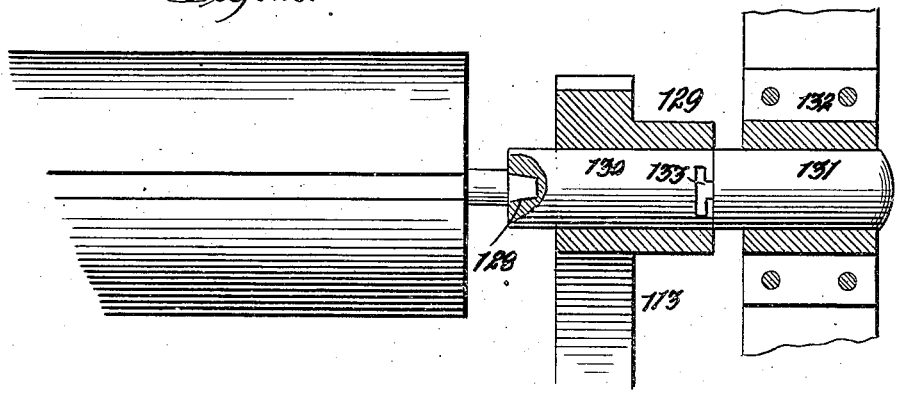
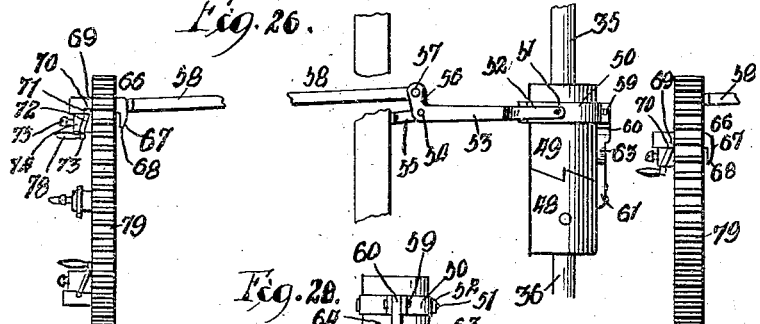
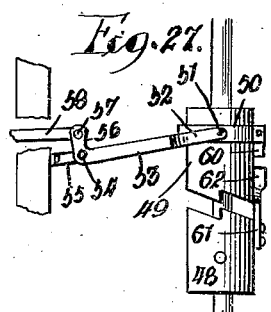
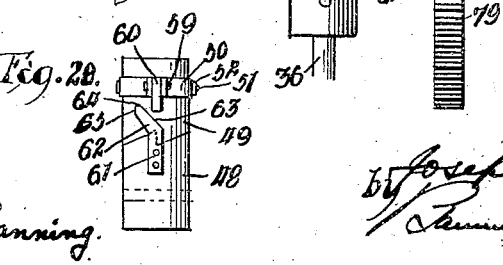

UNITED STATES PATENT OFFICE.

JOSEPH M. DENNING, OF CEDAR RAPIDS, IOWA.

MACHINE FOR REELING AND CUTTING OFF WIRE FENCING.

955,584. Specification of Letters Patent. Patented Apr. 19, 1910.

Application filed August 31, 1907. Serial No. 390,872.

*To all whom it may concern:*

Be it known that I, JOSEPH M. DENNING, a citizen of the United States, residing at Cedar Rapids, in the county of Linn and State of Iowa, have invented certain new and useful Improvements in Machines for Reeling and Cutting Off Wire Fencing, of which the following is a specification.

It is the practice, in the use of machines for making wire fence, to employ a reel or spool for receiving the completed fabric, and, as heretofore constructed, it has been necessary, when a reel or spool has been filled with the amount of fencing required, to stop the operation of the machine until the operator, by means of hand shears or nippers, had separated the wound fencing from the body of the fencing still in the machine, so as to permit the reel or spool, with the fencing thereon, to be removed and a new reel or spool placed in position for the next winding operation. This stoppage of the machine, during the time the operator is separating the wound fencing from the fencing in the machine, decreases the output in the machine by the loss of time used by the operator in making the separation.

The present invention relates to a machine or mechanism, adapted to be attached to or connected with a wire fence machine and automatically reel and sever the completed fencing into the lengths required to be wound onto a reel or spool.

The objects of the invention are to construct a machine adapted for attachment to and use with a machine for making wire fence and having a plurality of reels or spools, each reel or spool to receive a desired length of completed fabric to be wound or spooled, and having cutters automatically operated at the proper time for separating the wound or spooled fabric from the body of the fabric in the machine; to furnish a revoluble carrier receiving and supporting a plurality of reels or spools, onto each of which the required or desired length of completed fabric is wound automatically, and having each reel or spool detachably mounted on the revoluble carrier so that, when full, it can be removed and replaced by a new reel or spool, without interrupting the operation of the machine for making the fence; to automatically sever the length of fencing desired to be wound onto a reel or spool, without stopping the operation of the machine for making the wire fence, or the reeling or spooling mechanism; to furnish revoluble cutters having a plurality of blades, the number of blades corresponding to the number of longitudinal or strand wires, and operating for each pair of companion blades to cut or sever a longitudinal or strand wire and thereby separate the reeled fence or fabric from the main body of the fence or fabric; to employ measuring and tripping wheels, or disks, and means operated thereby to cause the cutters to act and sever the longitudinal or strand wires, when the length of completed fencing has passed through the cutters and is nearly reeled or spooled; to employ a pair of revoluble cutters, each cutter having blades for severing the longitudinal or strand wires at the proper time, and a measuring and tripping wheel and means whereby the cutters are made to revolve, when the desired length of completed fence or fabric has passed the cutters; to employ revoluble cutters for severing the longitudinal or strand wires of the completed fence or fabric, when the desired length of fence or fabric has passed the cutters, as indicated by measuring and tripping wheels, by means of which, and actuating devices, the cutters will be caused to revolve one revolution; to operate revoluble cutters through a revoluble wheel or disk carrying a plurality of cams or trippers and forming a measuring and tripping wheel for engaging and disengaging the driving means of the cutters and severing different lengths of completed fence or fabric; to provide a measuring and tripping wheel having a plurality of cams or trippers; and means for revolving the changeable measuring and tripping wheels and intermittently revolving the cutters; to operate revoluble cutters by means of a clutch mechanism actuated through the medium of a measuring and tripping wheel automatically revolved with the advance of the completed fencing or fabric; to construct a revoluble carrier supporting a plurality of removable reels or spools for receiving the completed fabric or fence; to initially revolve each reel or spool, as the reel or spool travels from a forward lowermost position to an uppermost position and continuing the revolving of the reel or spool, when the uppermost position is reached, until the required length of completed fence or fabric has been wound thereon; to automatically operate a cutting mechanism and a reeling or spooling mechanism so as to automatically sever a required length of completed fence or fabric, as wound onto the reel or spool, from the main body of the fence or fabric; to furnish an intermittently revoluble carrier supporting a plurality of reels or spools for the completed fencing or fabric, and automatically revolving each reel or spool to wind the completed fence or fabric thereon; to successively and automatically operate a plurality of winding reels or spools, supported on or by a revoluble carrier; to utilize a revoluble carrier supporting a plurality of detachable winding reels or spools, each reel or spool initially revolved by a pinion and a fixed segmental rack and its revolution completed by means of a driving shaft and a driven shaft constituting a divided shaft; to furnish a connecting mechanism, between the revoluble cutters and the revoluble carrier, by which the reels or spools will continue the winding operation, until the severed section of the completed fencing or fabric has been entirely wound or spooled, and this without interrupting or stopping the operation of the machine for making the wire fence, or the reeling and cutting off mechanisms of the present invention; to initially operate each reel or spool by a driving pinion and a segmental rack and complete the revolving of each reel or spool by a revoluble divided shaft and means for revolving the shaft; to engage and disengage the sections of the divided shaft for revolving each reel or spool, through the medium of a clutch, and a lever operated by a cam or tripping wheel in coöperative connection with the measuring and tripping wheel for the cutters; to give the carrier, supporting the plurality of reels or spools, an intermittent revolution by means of a divided driving shaft and a clutch connection between the two members of the shaft; to engage and disengage the sections of the divided shaft for driving the carrier by means of a clutch, a lever and a tripping wheel in operative connection with the measuring and tripping wheel of the cutters; to properly time the operation of the cutters and the reeling or spooling mechanism, so that when a reel or spool is filled, or nearly so, the cutters will automatically operate and sever from the main body of the wire fence or fabric a section of the proper length to be wound onto the reel or spool; to construct a cutting and reeling mechanism, having the capability of severing the required length of completed fence or fabric to be reeled or spooled from the main body of the fencing or fabric, and this without interrupting the continuous advance of the fence or fabric; to enable the mechanism for severing the completed fence or fabric and the mechanism for reeling or spooling a required length of section thereof, to be operative, and this without the necessity of stopping the machine for making the wire fence; to enable the cutting mechanism to be operated at proper intervals, for severing a required length of completed fence or fabric to be wound on the reel or spool; to furnish means for operating the cutting mechanism, as required, and for operating the reeling mechanism, as required; and this without stopping the operation of either mechanism; to furnish measuring and tripping wheels for actuating clutch devices by means of which the cutters and each reel or spool are operated; to furnish cutters for the fence or fabric, and a carrier, supporting a plurality of reels or spools onto which the completed fence or fabric is wound or reeled; and means for automatically operating both the cutters and each reel or spool as required for the section of fence or fabric to be reeled or spooled; and to improve generally the mechanisms, and the devices entering into each mechanism and the structure of the machine as a whole.

The invention consists in the features of construction and combinations of parts hereinafter described and claimed.

In the drawings Figure 1 is a side elevation of the machine of the present invention connected to the delivery end of a machine for making wire fence, which last-named machine is not illustrated in detail, as it can be of any usual and well known type of machines for making square mesh or other types of fencing; Fig. 2 a top or plan view of the machine shown in Fig. 1; Fig. 3 a central longitudinal section of the machine and arrangement shown in Fig. 1; Fig. 4 an end elevation looking from the front of the machine shown in Fig. 1; Fig. 5 an end elevation looking from the rear of the machine shown in Fig. 1; Fig. 6 a plan view, with the carrier and the reels or spools supported thereby and the cutters, together with the connections for operating the carrier and the cutters, removed, and showing the clutches and the operating levers therefor by which the carrier and the reels or spools are driven or revolved; Fig. 7 a cross section looking toward the rear of the machine, and showing the carrier and the reels or spools supported thereby, with the clutch and its operative means for revolving a reel or spool, when in the uppermost position; Fig. 8 a cross section looking toward the front of the machine and showing the cutters and the clutch for the carrier of the reels or spools; Fig. 9 a plan view, showing the driving means and the measuring and tripping wheels by which the clutches are operated, and showing in dotted lines the framework of the machine; Fig. 10 a side elevation of the devices or elements shown in Fig. 9, with the framework in dotted lines; Fig. 11 a face view of one of the measuring and tripping wheels partly broken away on one edge; Fig. 12 a cross section of the wheel shown in Fig. 11; Fig. 13 a detail, in side elevation, of one of the tripping cams or fingers; Fig. 14 a side elevation, showing in full and dotted lines the clutch for driving the carrier for the reels or spools, with the clutch members disengaged; Fig. 15 a similar view to Fig. 14, with the clutch members engaged; Fig. 16 an end elevation of one of the reels or spools; Fig. 17 an end elevation of one of the reels or spools, showing the clutch head for the driving shaft thereof; Fig. 18 a sectional elevation of a reel or spool and its driving shaft and locking bar, and showing also the journal support for each end of the driving shaft, and the driving means for initially revolving the reel or spool, and showing the sections of the reel or spool expanded; Fig. 19 a similar view to Fig. 18, showing the sections of the reel or spool contracted, and omitting the journal supports for the end of the shafts; Fig. 20 an enlarged detail, showing the driving connection for a reel or spool in its uppermost position; Fig. 21 a cross section on line *a* of Fig. 20 looking in the direction of the arrow, and showing the pinion and rack for initially revolving the reel or spool; Fig. 22 a cross section on line *b* of Fig. 20, showing the shoe and track for holding the pinion stationary; Fig. 23 a cross section on line *c* of Fig. 20, showing the pawl and stop for initially revolving the reel or spool in passing from a lower front position to an uppermost position; Fig. 24 an enlarged detail, showing the journal support for the reel at the opposite end to the driving end; Fig. 25 a similar view to Fig. 24, with the journal support partly in section; Fig. 26 an enlarged detail of the clutch and measuring and tripping wheel for revolving the cutters, showing the clutch engaged; Fig. 27 a similar view to Fig. 26, showing the clutch disengaged; Fig. 28 a detail of the clutch of Figs. 26 and 27, showing the finger and cam for disengaging the clutch members; Fig. 29 a top or plan view of a clamp or clasp and a cutter; and Fig. 30 a side elevation of the clamp or clasp and cutter shown in Fig. 29.

The construction shown has, on each side, a frame formed of legs 1, side bars or rails 2 between the legs, a front inclined standard or post 3, a rear vertical standard or post 4, and a top rail or bar 5, the two side frames forming a frame for supporting the carrier for the reels or spools and the other appliances of the machine. A bar or rail 6 connects each standard 3 with the upper end of a second frame, which may be the frame of a wire fence making machine, and a cross bar or rail 7 connects each post 3 with the second frame. The second frame is formed of two side frames, and, as shown, each side frame has legs 8, a cross bar or rail 9, a rear upright or post 10 and a front upright or post 11, both extending up from the cross bar or rail 9, cross bars or rails 12 between the uprights or posts 10 and 11, and a curved top bar or rail 13,—the two side frames forming the second frame. Each side frame has a web 14 and a web 15 furnishing the supports for journal boxes or bearings for the shafts of the wire fence making machine, the parts of which are not shown in detail. A journal box 16 on each upper cross rail 12 has mounted therein a shaft 17, which carries a geared roller or drum 18 over which the completed fence or fabric passes. The wire fence making machine of the second frame can be of the type disclosed in Letters Patent granted to me, No. 816,538, dated March 27, 1906, but other types of wire fence making machines can have the machine for reeling and severing the completed fence or fabric connected therewith. A bracket 19, having a flange or base is attached by suitable bolts, or otherwise, to the rear upright or post 10 of the frame adjacent to the top thereof, and this bracket, at its upper end, has a head 20 carrying a journal box or bearing 21, for a shaft 22; and a bracket 19 with a journal box or bearing is provided at each end of the shaft 22. The shaft 22 has mounted thereon a plurality of clamps or clasps 23, each having, on one side, split ears 24, by means of which and a tightening bolt 25, the clamp or clasp can be fixedly attached to the shaft 22, and each clamp or clasp 23, on the opposite side to the split ears 24, has a socket 26 to receive a cutter or blade 27, held in the socket by a set screw or bolt 28, or in any other suitable manner. A bracket or arm 29, having a flange or base is attached by suitable bolts to each post 10 of the frame, and the outer end of each bracket or arm 29 has a journal box or bearing corresponding to the journal box or bearing of the bracket arm or support 19, in which journal box or bearing are mounted the ends of a shaft 30, which shaft has also fixedly mounted thereon a plurality of clamps or clasps 23, each with a split ear on one side, by means of which and a tightening bolt each clamp or clasp can be secured to the shaft 30 as described for securing the clamps or clasps 23 to the shaft 22; and each clamp or clasp 23 for the shaft 30 has a socket 26 which receives a cutter or blade 27 held in place by a set screw or bolt 28, or otherwise. The shaft 30 has mounted thereon, adjacent to each end, a spur gear 31, each of which meshes with corresponding spur gears 32 on the shaft 22, so that the revolving of the shaft 30 will revolve the shaft 22 and cause two companion cutters 27 to act and sever a longitudinal or strand wire.

The shaft 30, at one end, has fixedly secured thereto the hub of a bevel gear 33, which meshes with a bevel gear 34, the hub of which is fixedly secured to the upper end of a divided shaft, formed of an upper section or member 35 and a lower section or member 36, each section mounted in a journal box 37, with the journal box for the upper section 35 on the end of an arm or bracket 38 and with the journal box 37 for the lower section of the divided shaft on the end of an arm or bracket 39, both arms or brackets extending out from one side frame, as shown in Figs. 1 and 2. The upper end of the section or member 35 has the bevel gear 34 fixedly secured thereto, and the lower end of the member or section 36 of the divided shaft has fixedly secured thereto the hub of a bevel gear or pinion 40, which meshes with a bevel gear or pinion 41 on the end of a shaft 42, supported in suitable journal boxes or bearings on the cross rails or bars 9 of the frame. The shaft 42 has fixedly mounted thereon a sprocket wheel 43, around which a sprocket chain 44 runs, which engages a sprocket wheel 45 on a shaft 46, mounted in a suitable journal box 47 carried by an arm or bracket from the side of the second frame, which shaft 46 has thereon fast and loose pulleys so that, by means of the fast pulley the shaft 46 can be continuously driven and through the sprocket wheels 43 and 45 and the sprocket chain 44 continuously revolve the shaft 42, which shaft, through the bevel gears or pinions 40 and 41, continuously drives the lower section or member 36 of the divided shaft.

The upper end of the lower section 36 of the divided shaft has fixedly secured thereto one member 48 of a clutch, the other member 49 of which is slidably mounted on the section 35 of the shaft. The clutch section 49 is encircled by a band 50, entered into a groove in the clutch section and having on opposite sides projecting pins 51, which pins are engaged by a fork 52 on the arm 53 of a bell crank lever, which lever is pivotally mounted by a pin or pivot 54 on a bracket or arm 55, extending out from the side of the second frame. The other arm 56 of the bell crank lever is connected by a pin or pivot 57, with the end of a push bar or rod 58, the other end of which push bar or rod is located adjacent to the face of a measuring and tripping wheel carrying a plurality of cams or trippers by which, as the wheel is revolved, the push bar or rod is advanced so as to operate the bell crank lever and cause the fork 52 thereof to depress the movable member 49 of the clutch, engaging the same with the fixed member 48 and revolving the section 35 of the divided shaft and with it the cutters carried by the shafts 22 and 30, as with the engagement of the clutch members 48 and 49, the divided shaft section 35 is revolved with the divided shaft section 36, revolving, through the bevel gears 33 and 34 and the gears 31 and 32, the shafts 22 and 30, for the cutters 27 to act and sever the longitudinal or strand wires of the completed fence or fabric. The cutters make one full revolution in severing the longitudinal or strand wires, and at the completion of each full revolution the revolving of the cutters stops. The construction shown, for stopping the revolving of the cutters, has attached to the clamping bolt 59 of the encircling ring 50 of the clutch member 49 a depending stop or finger 60, held in a fixed relation as regards rotation, but adapted to be raised and lowered vertically. A cam, having a body 61 and a neck 62, is fixedly attached to the clutch member 48 by bolts, or otherwise, and the neck 62, on one side, has an inclined face 63 terminating in a horizontal face 64, extending down from which is a straight face 65, so that, as the clutch members complete a revolution the inclined face 63 will engage the end of the finger or stop 60 and raise the finger or stop and with it the encircling ring 50 carrying upward the movable clutch member 49 and disengaging the clutch; and the upward movement of the clutch member 49 continues until the end face 64 of the cam passes the end face of the finger or stop 60, leaving the cam clear of the finger or stop and so that, with the next downward movement of the clutch member 49, the finger or stop 60 will pass the straight side face 65 of the cam, permitting the clutch members to engage and revolve the cutter shafts and cutters. It will thus be seen that the clutch is engaged automatically and disengaged automatically with each complete revolution of the divided shafts 35 and 36, giving the cutters one complete revolution at each operation and stopping the revolving of the cutters with the disengagement of the clutch members.

The end of the push rod or bar 58 is successively engaged by cams or pushers 66, each cam or pusher having a finger 67 terminating in an end 68 with a curved face, and having a stem or body 69 in which is a cross slot 70, which is engaged by a projection or lug 71 at the end of an inclined rib or flange 72, terminating at a lug or ear 73, and the lugs 71 and 73, with the flange 72, are formed on a ring 74 which encircles a stud or stem 75, having, as shown, a head 76 with a nick and a screw threaded end 77, so that, by means of a handle 78, the ring or collar 74, with the flange and lugs, can be turned and cause the flange to act in conjunction with the notch 70 and endwise move the stem or body 69 to project or withdraw the finger 67 of each cam or pusher, as shown in Figs. 11, 12 and 13. The cams or pushers are carried by a wheel or disk 79, with rectangular openings or holes 80 for the passage of the stems or bodies 69 of the cams or pushers, and the wheel or disk 79 has screw threaded holes 81, one for each threaded end of each journal pin or stud 75 of each collar 74, which threaded holes are located in proper relation to the rectangular holes for the flange of the collar to engage the notch of the stem of the cam or pusher, as shown in Fig. 12. The wheel or disk 79, on one side face, has an annular groove 82, into which all the fingers 67 can be entered, and thus enable one or more of the cams or pushers to be receded so that the receded cam or pusher will not be in position to engage the end of the push rod or bar 58 and operate the movable clutch member 49 of the section 35 of the divided shaft, thus giving a longer interval of time between each revolution of the cutters, and consequently a greater length of completed fence or fabric before severing the to-be wound section from the main body.

The periphery of the wheel or disk 79 is provided with teeth 83, and each tooth 83 has a concave outer face 84, as shown in Fig. 11. The disk or wheel 79 is mounted on a shaft 85, supported in a journal box or bearing 86 on the standard or upright 10 of the frame of the machine. A shaft 87 is located below or underneath the wheel or disk 79 and is mounted in a suitable journal box or bearing 88 on the standard or post 10 of the frame of the machine, and this shaft 87 has projecting out therefrom a tooth 89, which, as the shaft is revolved, enters a notch between two of the teeth 83 of the wheel or disk 79 and moves the wheel or disk forward one tooth; and with the passage of the tooth 89, from a notch of the wheel or disk 79, the concave face 84 of the next succeeding tooth 83 engages the periphery of the shaft 87 and holds the wheel or disk 79 against revolving, so that the face of the shaft 87 furnishes a track for the bearing or concave face of the teeth of the wheel or disk 79, by which the wheel or disk is held stationary, except as advanced step by step from the engagement of the tooth 89 with a notch of the wheel or disk 79, thus giving the wheel or disk 79 an intermittent rotation. The shaft 87 has fixedly attached thereto the hub of a sprocket wheel 90, over which a sprocket chain 91 runs, and the sprocket chain 91 engages a sprocket wheel 92, the hub of which is fixedly attached to a stub shaft 93, mounted in a journal box or bearing 94 on the second frame of the machine. The shaft 93 has fixedly mounted thereon the hub of a wheel or disk 95, the teeth 96 of which each have a concave face 97, and the wheel or disk 95 is given a step by step advance from the engagement of a tooth 98 on the shaft 42, with a notch of the wheel or disk, as the shaft 42 revolves, so that, with each full revolution of the shaft 42, the wheel or disk 95 will be advanced one tooth; and such advance of the wheel or disk 95 gives the shaft 93 an intermittent rotation, by means of which and the sprocket wheels 90 and 92 and sprocket chain 91, the shaft 87 is given an intermittent rotation, for the finger 89 of the shaft 87, at each complete revolution of the shaft, to engage a notch of the wheel or disk 79 and advance the wheel or disk 79 one tooth. The result is that the continuous revolution of the shaft 42, through the wheel or disk 95, and the tooth 98 on the shaft 42 transmits intermittent rotation to the shaft 87, for the finger 89 on the shaft 87 to intermittently rotate the wheel or disk 79 one tooth at each complete revolution of the shaft 87 from the continuous rotation of the shaft 42.

An inclined table or support 99 leads from the cutters downwardly and rearwardly and terminates, at its lower end, adjacent to the circle of travel of the reels or spools, and this table or support 99 is secured in position by an angle iron bracket 100 attached to each upright 3, and an angle iron bracket 101 attached to each upper cross bar or rail 2, as shown in Fig. 3. A pair of swinging arms or bars 102 is located above the table or support 99, and each arm or bar is pivotally mounted on a cross rod or shaft 103, supported by hangers 104 attached to the side rails 6 of the side frames. The free end of the arms or bars 102 has located between them a roller 105, mounted, so as to revolve, on a rod or shaft 106, which roller rests on the upper face of the fence or fabric and serves the office of a tightener for maintaining the fencing or fabric taut, when the winding reel or spool is in the elevated position, the roller rising gradually and resting on the fabric as the operative reel or spool is carried from its lowermost forward position to its uppermost or elevated position, thus maintaining the fencing or fabric taut during the initial winding and the final winding of the fencing or fabric on the reel or spool. The roller descends by gravity to its normal position, with the severing of the fencing or fabric by the cutters, so as to be in position to rest on the next succeeding section of fencing or fabric to be reeled or wound on the next succeeding reel or spool.

A shaft 107 is supported in suitable bearings 108 on the rear posts or uprights 4 of the frame, and on this shaft, adjacent to each side of the frame, and on the inside thereof, is mounted the carrier for the reels or spools, which carrier is in the form of gear wheels. Each gear has its hub 109 fixedly attached to the shaft 107 by set screws or bolts 110, and radiating from each hub 109 are the spokes or arms 111, connecting the hub or center of each gear with the rim or perimeter 112, as shown in Fig. 3. The hub, spokes and arms and rim form, on one side of the machine, a gear 113, and on the opposite side a gear 114, with the gears separated the required distance apart to receive between them the reels or spools and furnish a traveling support for the reels or spools. The rim 112 of the gear 114 has projecting out therefrom a plurality of hubs or bearings 115, three hubs or bearings being provided in the construction shown. Each hub or bearing 115 has mounted therein a stub shaft 116, and a stub shaft 117 is mounted in a suitable journal box or bearing 118 on the rear post or upright 4, which stub shaft 117 is in position to coact with each stub shaft 116, as the stub shaft 116 reaches its elevated or uppermost position in the revolution of the carrier. The stub shaft 117 has mounted on its inner end a member 119 of a clutch, which member is slidable on the shaft, and the clutch member 119 coacts with a clutch member 120, fixedly attached to the outer end of the stub shaft 116, so that with the revolving of the stub shaft 117 the stub shaft 116 will be driven continuously, while the engagement between the clutch members remains unbroken.

The stub shaft 116 has loosely mounted thereon a spur pinion 121, formed with or connected to a shoe 122, also loosely mounted on the stub shaft, and the shoe 122 carries a pawl 123, connected therewith by a pin or pivot 124, for the acting end of the pawl to engage a lug or stop 125 on the stub shaft 116, so that, with the revolving of the pinion 121, the pawl 123 will act and revolve the stub shaft 116; and such revolution occurs as each stub shaft 116 travels from its lowermost forward position to its uppermost or elevated position. The inner end of the stub shaft 116 has fixedly secured thereto a clutch member 126 by a cross pin 127, so that with the revolving of the stub shaft 116, the clutch member will be revolved. The inner end of each stub shaft 116 has formed therein a countersink or hole 128 to receive the trunnion or journal of the reel or spool shaft. The rim 112 of the gear 113 has thereon a plurality of hubs or bearings 129, three hubs or bearings 129 being provided in the arrangement shown. Each hub or bearing has mounted therein a stub shaft 130; and the inner end of each stub shaft has a countersink or hole 128, as in the stub shaft 116, to receive the trunnion or journal pin for the opposite end of the reel or spool shaft. A stub shaft 131 is mounted in a suitable box or bearing 132, attached to the rear post 4 of the side frame of the machine, and this stub shaft is located so as to be in line with the stub shaft 130, when each stub shaft 130 is in its elevated or uppermost position, so that the stub shaft 131 furnishes a stop and lock against end movement of the stub shaft 130, during the revolving of each reel or spool, when in the elevated or uppermost position. The stub shaft 130 is endwise movable, and, as shown, the outer end of the stub shaft has a T slot 133 to receive a suitable key or instrument, by means of which the stub shaft 130 can be drawn outwardly endwise, so as to release its engagement with the journal pin or trunnion of the reel or spool shaft and allow a filled reel or spool to be removed from the carrier and replaced by an empty reel or spool, as with the withdrawal of the stub shaft 130 from engagement with the reel or spool shaft, the opposite end of the reel or spool shaft can be withdrawn from the stub shaft 116, permitting the reel or spool to be removed. In placing an empty reel or spool in position the end of the reel or spool shaft is engaged with the stub shaft 116 and the stub shaft 130 is advanced or forced inwardly to engage the reel or spool shaft, mounting the reel between the stub shafts 116 and 130 and permitting it to revolve on the trunnions or journal pins of the reel shaft. Each reel or spool is formed of a section 134 and a section 135, each section of a semi-circular form in cross section. The sections are separated from each other longitudinally, by an opening 136 on one side and an opening 137 on the opposite side; and, as shown, the section 135 has secured to its inner face, so as to project beyond the edge of the section, a strip 138, attached by rivets 139 or otherwise, so as to leave a space 140 between the inner face of the section 135 and the guard strip or stop 138, into which space the leading or forward edge of the completed fencing or fabric enters and is held, so that with the revolving of the reel or spool, the leading edge will be caught and held against withdrawal, as the fencing or fabric commences its initial wind onto the outer face of the reel or spool.

Adjacent to each end of the section 134 is secured a head or plate 141, by means of a flange 142 and suitable rivets 143, or otherwise; and adjacent to each end of the section 135 is secured a head or plate 144, by a flange 145 and suitable rivets 143, or otherwise; and, as shown, the heads or plates 144 are inside of the heads or plates 141, and these heads or plates prevent endwise movement of the sections 134 and 135, when the reel or spool, as a whole, is assembled. Each head or plate 144 has a central slot 146, and the head or plate 141, at each end of the reel or spool, has a square opening 147 for the passage of the reel shaft 148, which shaft passes through the slots 146 and the square holes 147 and extends at each end beyond the ends of the reel or spool, in the arrangement shown. The reel shaft 148, at each end, has a journal pin or trunnion 149, which pins enter the countersinks or holes 128 in the ends of the stub shafts 116 and 130, when the reel is mounted in position between the supporting gears or carriers. The reel shaft, at the end, adjacent to the stub shaft 116, has fixedly secured thereto a clutch member 150, by a cross pin 151, which clutch member coacts with the clutch member 126 on the end of the stub shaft 116 so that, with the revolving of the stub shaft, the reel shaft 148 will be revolved, carrying with it the reel or spool as a whole. The reel or spool, in the construction shown, is collapsible, partially, so that its cross diameter can be decreased and permit the withdrawal of the reel or spool from the wound fencing or fabric. The construction shown has an endwise slidable bar 152, passing through a hole 153 in one of the heads or plates 141, and the opposite end is reduced in size and passes through a hole 154 in the opposite head or plate 141, so as to slidably support the bar in the heads or plates. The slidable bar 152 has formed thereon inclines 155, which engage an inclined face 156 of each head or plate 144, as shown in Figs. 18 and 19, so that with the advance of the inclines, to the position shown in Fig. 18, the reel or spool sections will be expanded to the full cross diameter, and with the withdrawal of the sliding bar 152, to the position shown in Fig. 19, the sections 134 and 135 can be contracted or brought closer together to reduce the diameter in cross section of the reel or spool. The sliding bar 152, in the arrangement shown, has at one end, a pin or grab 157, by means of which it can be forced forward or receded, so as to expand the reel or spool with the advance throw and contract the reel or spool with the receded throw.

The pinion 121 of each reel or spool is driven or revolved from a segmental rack or mutilated gear 158 having a fixed relation, and with which each pinion 121 successively engages, as the pinion passes upward from its lowermost front position; and during such upward passage the pinion 121, by meshing with the fixed segmental rack 158, is rotated from the point of start until the limit of upward movement is reached. The segmental rack or mutilated gear 158 is formed with or fixedly secured to a circular or annular track 159, over and against the exterior face of which the shoe 122 rides and holds the pinion 121 against rotation, after leaving the highest or uppermost position, and while being carried downwardly and around to its lowermost rear position and to its lowermost front position so that, during such travel of the reel or spool the revolving thereof is stopped. The segmental rack 158 and the track 159 are held in a fixed position by means of cross pieces or bars 160, attached at one end to the side frame of the machine and at the other end to the track, by means of suitable bolts 161 or otherwise, so as to leave a clear orbit or circle of travel for the pinions 121 and shoes 122 around the rack and track.

Each gear carrier 113 and 114 is driven by a spur pinion 162, fixedly mounted on a shaft 163, supported in journal boxes or bearings 164 on the ends of bracket arms 165, attached to the cross rail or bar 2 of each side frame, by a flange 166 and suitable bolts, so as to properly locate each pinion 162 in mesh with the gear or carrier driven therefrom. Each pinion 162 meshes with a pinion 167 on a shaft 168, supported in suitable bearings or journal boxes 169 on the cross rail or bar 2 of each side frame, which shaft has an intermittent rotation given thereto. The shaft 168 has fixedly attached thereto the hub 170 of a bevel pinion 172, the hub 173 of which is fixedly attached to a shaft 174; and the shaft 174 is mounted in a suitable journal box or bearing 175 on a U shaped frame or support 176, having ears or flanges 177 by means of which and suitable bolts 178 the frame is rigidly attached to a cross piece or bar 179 extending from side frame to side frame. The shaft 174 has slidably mounted on its forward end a clutch member 180, and the companion clutch member 181 is fixedly mounted on the rear end of a shaft 182, forming a divided shaft with the shaft 174, by means of which, when the clutch members are engaged, the bevel pinion 172 can be driven to drive the bevel pinion 171 and the shaft 168 and, through the meshing pinions 167 and 162, drive the gears or carrier for the reels or spools. The shaft 182 is supported in journal boxes or bearings 175$^a$ supported on a double U-shaped frame 176$^a$ connected with side frames by a cross bar 177$^a$, so as to firmly support the frame and shaft.

The clutch member 180, is encircled by a band 183, having projecting pins 184, which are engaged by the fork or straddle loop 185 of a lever 186, one end of which is connected by a pin or pivot 187 to a support or bar 188, attached by bolts or otherwise to the frame or support 176, so as to furnish a fixed pivot for the lever. The other end of the lever 182 is connected, by a pin or pivot 189, with a link 190; and the link 190 is connected by a pin or pivot 191, with the arm or member 192 of a bell crank lever, mounted on a pin or pivot 193 supported by an ear or bracket 194; and the other arm 195 of the bell crank lever, is inwardly turned to form a contact end 196, by means of which the bell crank lever is swung on its pin or pivot. The contact end 196 of the bell crank lever is located adjacent to a wheel or disk 197 having teeth 198, and each tooth 198 has a concave outer face 199, and the disk or wheel is located for engagement of the notches between the teeth 198 by a tooth 200 on the shaft 42, so that, as the shaft 42 is revolved, the wheel or disk 197 will be given an intermittent advance, as the tooth 200 engages a notch between the teeth of the wheel or disk, so as to advance the wheel or disk 197 a tooth at a time. The outer face of the wheel or disk 197 has therein a groove 201, like the groove 82 of the wheel or disk 79, and for the same purpose. The wheel or disk 197 carries a plurality of cams or pushers 202, corresponding to and of the same construction as the cams or pushers 66, and therefore a detailed description of the cams or pushers 202 is not required; and the cams or pushers 202 are advanced and receded by means of a flanged collar, corresponding to the collar 74 of the wheel or disk 79, so that, by moving the flanged collar, as described for the construction and operation of the wheel or disk 79, the cams or pushers 202 can be advanced into operative position or be withdrawn so as to be inoperative, as described for the cams or pushers 66 and operation of the cams or pushers 66 for the wheel or disk 79. The wheel or disk 197 is fixedly mounted on a shaft 203, supported in journal boxes on the side frames of the machine, and this shaft 203 has fixedly secured thereto the hub 204 of a bevel pinion 205, which meshes with a bevel pinion 206, the hub 207 of which is fixedly attached to the shaft 182, for intermittently driving the shaft with the intermittent rotation of the disk or wheel 197.

A sprocket wheel 208 is fixedly attached to the end of the stub shaft 117, and over this sprocket wheel 208 a sprocket chain 209 runs, which sprocket chain is engaged by a sprocket wheel 210 on the end of a shaft 211, suitably driven from the main shaft of the fence making machine, or otherwise, so that the stub shaft 117 is given a continuous rotation.

The movable member 119 of the clutch for driving or revolving each reel or spool is encircled by a band 212, having projecting pins 213, which are engaged by the fork 214 of a lever 215, mounted on a pin or pivot 216, carried by a support or bracket 217 attached to the side frame of the machine. The inner end of the lever 215 is turned to form an ear 218, and is connected by a pin or pivot 219 with a link 220, the inner end of which is connected, by a pin or pivot 221, to the upper end of a vertical lever 222, mounted on a pin or pivot 223, carried by an arm or support 224 attached to a cross rail or angle iron 225, extending from side frame to side frame of the machine. The lower end of the lever 222 is engaged by a pin 226, carried by a revoluble gear 227, mounted on a journal or pin 228, carried by a bracket arm 229 attached to the frame of the machine; and the spur gear 227 is in mesh with a spur pinion 230 on the fixed member 181 of the clutch for driving the gear which revolves the reel or spool carrier. The spur gear 227 has, on its side face, a cam 231, which engages an arm 232 on the ring of the movable member 180 of the clutch, or otherwise attached to the clutch member, so that as the gear 227 revolves the cam 231 will act against the arm 232 and move the sliding member 180 of the clutch out of engagement with the fixed member 181 thereof, stopping the revolving of the reel or spool carrier, until the clutch members are again engaged. The inner end of the lever 215 is connected, by a pin or pivot 233, with the end of a lever 234, mounted on a pin or pivot 235, carried by an arm or bracket 236 extending out from the side frame of the machine, and the end of the lever 234 is inwardly turned to furnish a contact 237, engaged by the cams or pushers 202 of the wheel or disk 197, so as to operate the lever 234 and swing the lever 215 outwardly disengaging the clutch member 119 from the clutch member 120 and stopping the rotation of the stub shaft 116 from the sprocket 208; and such release of the clutch members 119 and 120 occurs with the commencement of the forward rotation of the carrier for the reels or spools by which a filled reel or spool is swung downward from the elevated or uppermost position to its lower rear position at the rear or discharge end of the machine. The movable member 119 is thrown into engagement with the fixed member 120 to drive the stub shaft 116, by the gear 227, which carries the pin 226 around to strike the lever 222, and, through the link 220, move the arm or lever 115 inwardly at the clutch end to engage the clutch members 119 and 120 and cause the sprocket wheel 208 to drive the stub shaft 116 and with it the reel or spool; and such engagement of the clutch member 119 and 120 occurs as each reel or spool reaches its elevated or uppermost position, where the completion of the winding or spooling of the fencing or fabric is attained.

The completed fencing or fabric, as it leaves the fence making machine passes, between the cutters, and its forward end is led by the guide or table 99 so as to enter the slot or opening 137 in the empty reel or spool which is at the lowermost forward position, as shown in Figs. 1, 2 and 3, for the leading end of the completed fencing or fabric to strike the guard 138 and be turned or deflected into the space 140, so as to furnish a hook or lap over the edge of the wall or shell of the reel or spool, against disengagement of the leading end of the completed fence or fabric from the reel or spool. The forward lowermost empty reel or spool is the one to be filled, and the lower rearward empty reel or spool is also in position, so that, with the revolving of the carrier it will be advanced to occupy the position of the preceding lowermost forward reel or spool; and in each advance of the carrier the reel or spool, which was originally the lowermost forward one will be elevated to its uppermost or raised position for completing the winding. The carrier commences to revolve, when the leading edge of the completed fence or fabric has been entered into the space 140, at which time the clutch sections 180 and 181 are engaged, for the shaft 182 to drive the shaft 174, and, through the bevel pinions 170 and 172, drive the shaft 168, for the pinions 167 on said shaft to drive the pinions 162, and cause the pinions 162 to revolve the gear carriers 113 and 114, and such revolving will continue until the clutch members 180 and 181 are disengaged. The forward revolution or travel of the gear carriers, raises the reel or spool, into which the leading edge of the completed fence or fabric is entered, and such upward movement of the reel or spool, through the engagement of the pinion 121 with the segmental rack 158, through the pawl 123 in engagement with the lug or stop 125, revolves the stub shaft 116, and, through the clutch members 126 and 150, drives the reel shaft 148, revolving the reel or spool and winding the completed fence or fabric onto the outer face of the reel or spool, and such winding, from the revolving of the reel or spool, will continue until the pinion 121 reaches the upper end of the segmental rack 158, at which time the reel or spool which is being filled has reached its highest or uppermost position. The shoe 122, as the pinion 121 reaches the end of the segmental rack 158, engages the track 159 and holds the pinion 122 against further revolution, and at this time the clutch member 119 is moved into engagement with the clutch member 120, connecting the stub shafts 117 and 116 for the sprocket wheel 208 to drive both shafts, and, through the stub shaft 116, drive the reel shaft 148, causing the reel or spool to revolve and continue winding the completed fabric onto the reel or spool; and during such winding of the completed fence or fabric onto the reel or spool, the tightener roller 105, resting on the completed fence or fabric, maintains the same taut and under proper condition for winding onto the reel or spool.

The length of fence or fabric wound onto a reel or spool will depend upon the set of the cams or pushers 66 of the measuring and tripping wheel 79, and with all the cams or pushers advanced the cutters will operate as each cam or pusher reaches and engages the push rod or bar 58 to advance such rod or bar, and, through the arm 53 of the bell crank lever, engage the clutch member 49 with the clutch member 48 for the shaft 36 to revolve the shaft 35 and, through the bevel gears 33 and 34, revolve the cutter shaft 30, which, through the meshing pinions 31 and 32, will drive the cutter shaft 22 and cause the cutters 27 to act and sever the several longitudinal or strand wires, separating the section of fence or fabric to be wound onto a reel or spool from the main body of fence or fabric. The severed section will be fully wound onto the reel or spool when the clutch member 119 is disengaged from the clutch member 120, by the action of the lever 215 and the lever 234, through the engagement of a cam or pusher 202 of the tripping wheel 197, which wheel is operated in correlation with the measuring and tripping wheel 79, after the cutters have acted and severed the to-be wound length of fence or fabric from the main body of the fence or fabric. The feed of the fence or fabric is not stopped after the to-be wound section has been severed, but continues right along for the leading edge to enter the empty spool or reel which occupies the lowermost forward position; and, with the entering of the leading edge into the space 140 to be lapped over the edge of the wall or shell of the reel or spool, the clutch members 180 and 181 are again engaged, causing the carrier to again revolve and carry the to-be filled reel or spool upwardly and to carry the rear empty reel or spool into the lowermost forward position, and to carry the filled reel or spool to the lowermost rearward position, where it can be removed and replaced by an empty reel or spool. The next to-be filled reel or spool will be carried upwardly and in its upward travel will be rotated or revolved by the segmental rack and pinion, as already described, until the upper end of the segmental rack has been reached, at which point this reel or spool will have its revolution continued by the engagement of the clutch members 119 and 120, as already described; and when the required length of fence or fabric has been measured off to complete the winding, the cutters will act as already described and sever the section from the main body of the fence or fabric. These operations will continue so long as the machine is operated, that is to say, an empty forward lower reel or spool receives the leading edge of the to-be wound section of fence or fabric and is elevated to its highest or uppermost position and at the same time an empty rearward lower reel or spool is carried into position to be filled, and with the filling of each reel or spool, as the carrier revolves, the filled spool is caused to descend and a to-be filled spool is elevated and initially filled and an empty spool is carried forward into receiving position, thus making the operation of the machine entirely automatic in severing and reeling or spooling the lengths of fence or fabric.

At the start of the machine an empty reel or spool is in a lowermost forward position and an empty reel or spool is at the lowermost rearward position, with both reels or spools stationary, for the lowermost forward empty reel or spool to receive the leading end of the fencing or fabric, and when the leading end of the fencing or fabric has been fully entered into the space 140, the clutches 180 and 181 are engaged to revolve the carrier and raise the reel or spool from its lowermost forward position to its elevated or uppermost position; and such engagement of the clutch sections or members 180 and 181 is attained by moving the sliding member 180 of the clutch into engagement with the fixed member 181 by the lever 186, link 190 and bell-crank lever, having the arms 192 and 195, through the engagement of a cam or pusher 202 with the contact end 196 of the bell crank lever, which cam or pusher 202 has been brought into position to engage the contact end 196 of the bell crank lever by the rotation of the shaft 42 for the tooth 200 on the shaft 42 to successively engage the required number of notches, between the teeth 198 of the wheel or disk 197, as the fence or fabric travels downwardly from the fence making machine between the cutters and on the guide or table 99 to the receiving reel or spool. The clutch members 180 and 181 continue in engagement, for revolving the carrier supporting the reels or spools, until the reel or spool which is being filled and the rearward empty reel or spool have been advanced to occupy respectively an elevated position for the to-be filled reel or spool and a lowermost forward position for the empty reel or spool, at which time the clutch members 180 and 181 are disengaged by the cam 231 on the spur gear 227 striking the arm 232 on the clutch member 180 and receding such clutch member out of engagement with the clutch member 181 and stopping the revolving of the carrier for the reels or spools; and, with the disengagement of the clutch members 180 and 181, the clutch members 119 and 120 are engaged to continue the revolving of the reel or spool which is at the elevated or uppermost position; the engagement of the clutch member 119, with the clutch member 120 is attained by the pin 226 striking the end of the lever 222 and, through the link 220, moving the lever 215 to carry the sliding member 119 into engagement with the clutch member 120, for the sprocket wheel 208 to revolve the stub shaft 116 and, through the stub shaft, revolve the reel or spool which is in the elevated or uppermost position. The revolving of the elevated or uppermost reel or spool continues until the clutch members 119 and 120 are disengaged and the disengagement of the clutch members 119 and 120 occurs when a cam or pusher 202 of the wheel or disk 197 has been advanced by the engagement of the finger 200 on the shaft 49 to bring the acting cam or pusher 202 into position to engage the contact end 237 of the lever 234 and move the forward end of such lever inward, which moves the forward end of the lever 215 outward, carrying with it the clutch member 119, disengaging the member 119 from the clutch member 120 and stopping the revolving of the stub shaft 116 and with it the revolving of the filled reel or spool.

The measuring wheel 79 is revolved coincidently with the tripping wheel 198 by the engagement of the tooth 98 on the shaft 42, with the notches between the teeth 96 of the wheel or disk 95, and the wheel or disk 97 is advanced step by step, so as to cause a cam or pusher 66 to engage the contact end of the rod or bar 58 and advance the rod or bar to move the arm 53 of the bell crank lever and engage the movable clutch member 49 with the fixed clutch member 48, for the shaft 35 to be engaged with the shaft 36 and revolve the cutters; and such engagement of the divided shafts 35 and 36 occurs prior to the engagement of a cam or pusher 202 with the contact end 237 of the lever 234 for disengaging the clutch members 119 and 120, so that the reel or spool will continue to be revolved until the tail end of the length of fence or fabric, which is being wound onto the reel or spool, is entirely wound thereon, during which period of time the cutters are carried around so as to be inoperative and the revolving of the cutters is stopped by the disengagement of the clutch members 48 and 49 of the divided driving shafts 35 and 36, leaving the cutters non-acting, so that the leading edge of the main body of the fencing or fabric can pass downward to enter the lowermost forward empty reel or spool, which is stationary and so remains until the leading edge of the fence or fabric has entered the space 140 to be overlapped onto the edge of the wall or shell of the reel or spool, as the reel or spool commences its upward travel or movement, by the engagement of the clutch members 180 and 181 to drive or revolve forward the reel or spool carrier. It will thus be seen that the clutch members 180 and 181 are first engaged and then released with the engagement of the clutch members 119 and 120, and that the clutch members 48 and 49 are engaged to drive the cutters and sever the to-be wound section or length of fence or fabric from the main body of the fence or fabric, and such severing occurs prior to the release of the clutch members 119 and 120 for revolving the reel or spool to complete the winding of the severed length of fence or fabric, thus insuring an initial winding and a complete winding and a severing of the fence or fabric before the complete winding of the severed length of the fence or fabric; and the engagement of the several clutch members at the proper time is attained by the revolving of the tripping wheels or disks successively and coincidently from the revolving of the main shaft 42 by the engagement of the teeth 98 and 200 on said shaft, which teeth respectively advance the measuring and tripping wheels 79 and 197, the measuring and tripping wheel 79 being advanced by the engagement of the tooth 89 on the shaft 87, as the shaft 87 is revolved from the driving means therefor.

The machine of the present invention enables varying lengths of wire fence or fabric to be severed and properly reeled or spooled and performs the work of severing and reeling or winding automatically after the machine is started; and such severing and winding or reeling of the wire fence or fabric in nowise interferes with the operation of the wire fence making machine; nor does the severing of the wire fence fabric interfere with the operation of the reels or spools on which the required length of wire fence or fabric is reeled or spooled. The construction shown has an independent frame for mounting the severing and reeling appliances, but it is to be understood that a frame adapted for mounting the wire fence making mechanisms and the mechanisms for severing and reeling or spooling the completed fence or fabric can be constructed, but the separate frame enables the cutting or severing attachment and the reeling or spooling attachment to be connected with a wire fence making machine previously constructed, and this without changing the construction of the wire fence making machine.

The measuring and tripping wheels or disks 79 and 197 in the form shown each have four adjustable cams or trippers, and this arrangement enables all four of the cams or trippers to be projected for use or two only of the cams or trippers to be projected for use, the other two cams being receded, or only one cam or tripper to be projected for use the other three cams or trippers being receded; and with two cams or trippers projected double the length of fencing or fabric will be reeled or spooled, than when all four pairs of cams or trippers are projected, and with one cam or tripper only projected four times the length of fence or fabric will be spooled or reeled, than where all four cams or trippers are projected, thus enabling varying lengths of fence or fabric to be reeled or spooled with the machine. It is to be understood, however, that where the machine is to reel or spool a uniform length of fence or fabric, one cam or tripper could be provided so as to sever the same length of fence or fabric at each complete operation of the reeling or spooling means; or two fixed cams or trippers could be provided for each cam or tripper to operate in severing the fence or fabric to be reeled or spooled.

What I claim as new and desire to secure by Letters Patent is:

1. In a machine for reeling and cutting off wire fence, the combination of cutters adapted to sever each longitudinal or strand wire of the fence, and means for operating the cutters at regular intervals and severing a predetermined to-be reeled length of fence from the main body, substantially as described.

2. In a machine for reeling and cutting off wire fence, the combination of cutters adapted to sever each longitudinal or strand wire of the fence, means for operating the cutters at regular intervals and severing a predetermined to-be reeled length of fence from the main body, an intermittently revoluble carrier, and a detachable reel or spool mounted on the carrier and adapted for winding thereon a length of severed fence, substantially as described.

3. In a machine for reeling and cutting off wire fence, the combination of cutters adapted to sever each longitudinal or strand wire of the fence, means for operating the cutters at regular intervals and severing a predetermined to-be reeled length of fence from the main body, an intermittently revoluble carrier, a detachable reel or spool mounted on the carrier and adapted for winding thereon a length of severed fence, and means for intermittently revolving the carrier, substantially as described.

4. In a machine for reeling and cutting off wire fence, the combination of cutters adapted to sever each longitudinal or strand wire of the fence, means for operating the cutters at regular intervals and severing a predetermined to-be reeled length of fence from the main body, an intermittently revoluble carrier, a detachable reel or spool mounted on the carrier and adapted for winding thereon a length of severed fence, and means for revolving the reel or spool to initially wind the length of fence thereon, substantially as described.

5. In a machine for reeling and cutting off wire fence, the combination of cutters adapted to sever each longitudinal or strand wire of the fence, means for operating the cutters at regular intervals and severing a predetermined to-be reeled length of fence from the main body, an intermittently revoluble carrier, a detachable reel or spool mounted on the carrier and adapted for winding thereon a length of severed fence, means for revolving the reel or spool to initially wind the length of fence thereon, and means for revolving the reel or spool and completing the wind of the length of fence thereon, substantially as described.

6. In a machine for reeling and cutting off wire fence, the combination of cutters adapted to sever each longitudinal or strand wire of the fence, means for operating the cutters at regular intervals and severing a predetermined to-be reeled length of fence from the main body, an intermittently revoluble carrier, a detachable reel or spool mounted on the carrier and adapted for winding thereon a length of severed fence, means for intermittently revolving the carrier, and means for revolving the reel or spool to initially wind the length of fence thereon, substantially as described.

7. In a machine for reeling and cutting off wire fence, the combination of cutters adapted to sever each longitudinal or strand wire of the fence, means for operating the cutters at regular intervals and severing a predetermined to-be reeled length of fence from the main body, an intermittently revoluble carrier, a detachable reel or spool mounted on the carrier and adapted for winding thereon a length of severed fence, means for intermittently revolving the carrier, means for revolving the reel or spool to initially wind the length of fence thereon, and means for revolving the reel or spool and completing the winding of the length of fence thereon, substantially as described.

8. In a machine for reeling and cutting off wire fence, the combination of cutters adapted to sever each longitudinal or strand wire of the fence, means for operating the cutters at regular intervals and severing a predetermined to-be reeled length of fence from the main body, an intermittently revoluble carrier, and a plurality of detachable reels or spools mounted on the carrier, substantially as described.

9. In a machine for reeling and cutting off wire fence, the combination of cutters adapted to sever each longitudinal or strand wire of the fence, means for operating the cutters at regular intervals and severing a predetermined to-be reeled length of fence from the main body, an intermittently revoluble carrier, a plurality of detachable reels or spools mounted on the carrier, and means for intermittently revolving the carrier, substantially as described.

10. In a machine for reeling and cutting off wire fence, the combination of cutters adapted to sever each longitudinal or strand wire of the fence, means for operating the cutters at regular intervals and severing a predetermined to-be reeled length of fence from the main body, an intermittently revoluble carrier, a plurality of detachable reels or spools mounted on the carrier, means for intermittently revolving the carrier, and means for revolving each reel or spool in succession in passing from a lowermost forward position to an uppermost position, substantially as described.

11. In a machine for reeling and cutting off wire fence, the combination of cutters adapted to sever each longitudinal or strand wire of the fence, means for operating the cutters at regular intervals and severing a predetermined to-be reeled length of fence from the main body, an intermittently revoluble carrier, a plurality of detachable reels or spools mounted on the carrier, means for intermittently revolving the carrier, and means for revolving each reel or spool in succession at the uppermost position therefor and completing the wind of the severed length of fence on each reel or spool, substantially as described.

12. In a machine for reeling and cutting off wire fence, the combination of cutters adapted to sever each longitudinal or strand wire of the fence, means for operating the cutters at regular intervals and severing a predetermined to-be reeled length of fence from the main body, an intermittently revoluble carrier, a plurality of detachable reels or spools mounted on the carrier, means for intermittently revolving the carrier, means for revolving each reel or spool in succession in passing from a lowermost forward position to an uppermost position, and means for revolving each reel or spool in succession at the uppermost position therefor and completing the wind of the severed length of fence on each reel or spool, substantially as described.

13. In a reeling and cutting off mechanism for wire fence, the combination of an intermittently revoluble carrier, a plurality of detachable reels or spools mounted on the carrier, and means for intermittently revolving the carrier, substantially as described.

14. In a reeling and cutting off mechanism for wire fence, the combination of an intermittently revoluble carrier, a plurality of detachable reels or spools mounted on the carrier, means for intermittently revolving the carrier, and means for revolving each reel or spool in succession in passing from a lowermost position to an uppermost position, substantially as described.

15. In a reeling and cutting off mechanism for wire fence, the combination of an intermittently revoluble carrier, a plurality of detachable reels or spools mounted on the carrier, means for intermittently revolving the carrier, and means for revolving each reel or spool in succession at the uppermost position therefor and completing the wind of the severed length of fence on each reel or spool, substantially as described.

16. In a reeling and cutting off mechanism for wire fence, the combination of an intermittently revoluble carrier, a plurality of detachable reels or spools mounted on the carrier, means for intermittently revolving the carrier, means for revolving each reel or spool in succession in passing from a lowermost position to an uppermost position, means for revolving each reel or spool in succession at the uppermost position therefor and completing the wind of a severed length of fence on each reel or spool, substantially as described.

17. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, and means for automatically engaging and disengaging the clutch connection at predetermined and regular intervals and revolving and stopping the two cutter shafts, substantially as described.

18. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, and means for automatically engaging and disengaging the clutch connection at predetermined and regular intervals and revolving and stopping the two cutter shafts, substantially as described.

19. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, a bell-crank lever connected with the slidable member of the clutch, a push rod for the bell-crank lever, and a revoluble disk engaging the push rod and operating the bell-crank lever for engaging the clutch members and revolving and stopping the two cutter shafts, substantially as described.

20. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, a bell crank lever connected with the slidable member of the clutch, a push rod for the bell crank lever, a revoluble disk, a cam carried by the revoluble disk and engaging the push rod and operating the bell crank lever for engaging the clutch members and revolving and stopping the two cutter shafts, substantially as described.

21. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, a bell-crank lever connected with the slidable member of the clutch, a push rod for the bell-crank lever, a revoluble disk, a plurality of adjustable cams carried by the revoluble disk, each cam engaging the push rod and operating the bell-crank lever for engaging the clutch members and revolving and stopping the two cutter shafts, substantially as described.

22. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, a bell-crank lever connected with the slidable member of the clutch, a push rod for the bell-crank lever, a revoluble driven disk having a notched and toothed periphery, a cam carried by the revoluble disk and engaging the push rod and operating the bell-crank lever for engaging the clutch members, and means for revolving the disk one tooth at a time, substantially as described.

23. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, a bell-crank lever connected with the slidable member of the clutch, a push rod for the bell-crank lever, a revoluble driven disk having a notched and toothed periphery, a plurality of adjustable cams carried by the revoluble disk, each cam engaging the push rod and operating the bell-crank lever for engaging the clutch member, and means for revolving the disk one tooth at a time, substantially as described.

24. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, a bell-crank lever connected with the slidable member of the clutch, a push rod for the bell-crank lever, a revoluble driven disk having a notched and toothed periphery, a cam carried by the revoluble disk and engaging the push rod and operating the bell-crank lever for engaging the clutch members, a revoluble shaft, and a tooth on the shaft engaging in succession the notches of the driven disk for revolving the disk one tooth at a time, substantially as described.

25. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, a bell-crank lever connected with the slidable member of the clutch, a push rod for the bell-crank lever, a revoluble driven disk having a notched and toothed periphery, a plurality of adjustable cams carried by the revoluble disk, each cam engaging the push rod and operating the bell-crank lever for engaging the clutch member, a revoluble shaft, and a tooth on the shaft engaging the notches of the driven disk, for revolving the disk one tooth at a time, substantially as described.

26. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, a bell-crank lever connected with the slidable member of the clutch, a push rod for the bell-crank lever, a revoluble driven disk having a notched and toothed periphery, a cam carried by the revoluble disk and engaging the push rod and operating the bell-crank lever for engaging the clutch members, a revoluble shaft, a tooth on the shaft engaging in succession the notches of the driven disk, a sprocket wheel on the shaft, a sprocket chain for the sprocket wheel, a second sprocket wheel over which the sprocket chain runs, a shaft for the second sprocket wheel, a revoluble driving disk having a notched and toothed periphery on the shaft of the second sprocket wheel, and means for revolving the shaft of the driving disk, substantially as described.

27. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, a bell-crank lever connected with the slidable member of the clutch, a push rod for the bell-crank lever, a revoluble driven disk having a notched and toothed periphery, a plurality of adjustable cams carried by the revoluble disk, each cam engaging the push rod and operating the bell-crank lever for engaging the clutch member, a revoluble shaft, a tooth on the shaft engaging the notches of the driven disk, a sprocket wheel on the shaft, a sprocket chain for the sprocket wheel, a second sprocket wheel over which the sprocket chain runs, a shaft for the second sprocket wheel, a revoluble driving disk having a notched and toothed periphery on the shaft of the second sprocket wheel, and means for revolving the shaft of the driving disk, for revolving the disk one tooth at a time, substantially as described.

28. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, a bell-crank lever connected with the slidable member of the clutch, a push rod for the bell-crank lever, a revoluble driven disk having a notched and toothed periphery, a cam carried by the revoluble disk and engaging the push rod and operating the bell-crank lever for engaging the clutch members, a revoluble shaft, a tooth on the shaft engaging in succession the notches of the driven disk, a sprocket wheel on the shaft, a sprocket chain for the sprocket wheel, a second sprocket wheel over which the sprocket chain runs, a shaft for the second sprocket wheel, a revoluble driving disk having a notched and toothed periphery on the shaft of the second sprocket wheel, and a tooth on the continuously revoluble main driving shaft engaging the notches of the driving disks and giving both disks a step by step advance, substantially as described.

29. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, a bell-crank lever connected with the slidable member of the clutch, a push rod for the bell-crank lever, a revoluble driven disk having a notched and toothed periphery, a plurality of adjustable cams carried by the revoluble disk, each cam engaging the push rod and operating the bell-crank lever for engaging the clutch member, a revoluble shaft, a tooth on the shaft engaging the notches of the driven disk, a sprocket wheel on the shaft, a sprocket chain for the sprocket wheel, a second sprocket wheel over which the sprocket chain runs, a shaft for the second sprocket wheel, a revoluble driving disk having a notched and toothed periphery on the shaft of the second sprocket wheel, and a tooth on the continuously revoluble main driving shaft engaging the notches of the driving disk and giving both disks a step by step advance, substantially as described.

30. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, a bell-crank lever connected with the slidable member of the clutch, a push rod for the bell-crank lever, a revoluble driven disk having a notched and toothed periphery, a plurality of adjustable cams carried by the revoluble disk, each cam engaging the push rod and operating the bell-crank lever for engaging the clutch member, means for advancing and receding each cam, and means for revolving the disk one tooth at a time, substantially as described.

31. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, a bell-crank lever connected with the slidable member of the clutch, a push rod for the bell-crank lever, a revoluble driven disk having a notched and toothed periphery, a plurality of adjustable cams carried by the revoluble disk, each cam engaging the push rod and operating the bell-crank lever for engaging the clutch member, a revoluble collar for each cam, an inclined flange on each collar engaging the cam, and means for revolving the disk one tooth at a time, substantially as described.

32. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, a bell-crank lever connected with the slidable member of the clutch, a push rod for the bell-crank lever, a revoluble driven disk having a notched and toothed periphery, a cam carried by the disk and engaging the push rod and operating the bell-crank lever for engaging the clutch members and revolving and stopping the two cutter shafts, a driving disk having a notched and toothed periphery, a driving connection between the two disks, and means for revolving the driving disk, substantially as described.

33. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, a bell-crank lever connected with the slidable member of the clutch, a push rod for the bell-crank lever, a revoluble driven disk having a notched and toothed periphery, a cam carried by the disk and engaging the push rod and operating the bell-crank lever for engaging the clutch members and revolving and stopping the two cutter shafts, a driving disk having a notched and toothed periphery, a driving connection between the two disks, a continuously revoluble main driving shaft, and a tooth on the main driving shaft engaging the notches of the driving disk, substantially as described.

34. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, a bell-crank lever connected with the slidable member of the clutch, a push rod for the bell-crank lever, a revoluble driven disk having a notched and toothed periphery, a plurality of adjustable cams carried by the disk, each cam engaging the push rod and operating the bell-crank lever for engaging the clutch members and revolving and stopping the two cutter shafts, means for advancing and receding each cam, a driving disk having a notched and toothed periphery, a driving connection between the two disks, and means for revolving the driving disk, substantially as described.

35. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, a bell-crank lever connected with the slidable member of the clutch, a push rod for the bell-crank lever, a revoluble driven disk having a notched and toothed periphery, a plurality of adjustable cams carried by the disk, each cam engaging the push rod and operating the bell-crank lever for engaging the clutch members and revolving and stopping the two cutter shafts, a revoluble collar for each cam, an inclined flange on each collar engaging the stem of the cam, a driving disk having a notched and toothed periphery, a driving connection between the two disks, and means for revolving the driving disk, substantially as described.

36. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, a bell-crank lever connected with the slidable member of the clutch, a push rod for the bell-crank lever, a revoluble driven disk having a notched and toothed periphery, a plurality of adjustable cams carried by the disk, each cam engaging the push rod and operating the bell-crank lever for engaging the clutch members and revolving and stopping the two cutter shafts, means for advancing and receding each cam, a driving disk having a notched and toothed periphery, a driving connection between the two disks, a continuously revoluble main driving shaft, and a tooth on the continuously revoluble main driving shaft engaging the notches of the driving disk, substantially as described.

37. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, a bell-crank lever connected with the slidable member of the clutch, a push rod for the bell-crank lever, a revoluble driven disk having a notched and toothed periphery, a plurality of adjustable cams carried by the disk, each cam engaging the push rod and operating the bell-crank lever for engaging the clutch members and revolving and stopping the two cutter shafts, a revoluble collar for each cam, an inclined flange on each collar engaging the stem of the cam, a driving disk having a notched and toothed periphery, a driving connection between the two disks, a continuously revoluble main driving shaft, and a tooth on the continuously revoluble main driving shaft for engaging the notches of the driving disk, substantially as described.

38. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, a bell-crank lever connected with the slidable member of the clutch, a push rod for the bell-crank lever, a revoluble driven disk having a notched and toothed periphery, a plurality of adjustable cams carried by the disk, each cam engaging the push rod and operating the bell-crank lever for engaging the clutch members and revolving and stopping the two cutter shafts, means for advancing and receding each cam, a driving disk having a notched and toothed periphery, a driving connection between the two disks, a continuously revoluble main driving shaft, a tooth on the continuously revoluble main driving shaft engaging the notches of the driving disk, and means for driving the continuously revoluble main driving shaft, substantially as described.

39. In a machine for reeling and cutting off wire fence, the combination of a pair of shafts, a plurality of cutting blades carried by each shaft, with the blades arranged in pairs and each pair of blades adapted to sever a longitudinal or strand wire of the fence, a driving connection between the two shafts, a divided driven shaft, a clutch connection between the sections of the divided driven shaft, a continuously revolving main driving shaft, a driving connection between the continuously revolving main driving shaft and one section of the divided driven shaft, a bell-crank lever connected with the slidable member of the clutch, a push rod for the bell-crank lever, a revoluble driven disk having a notched and toothed periphery, a plurality of adjustable cams carried by the disk, each cam engaging the push rod and operating the bell-crank lever for engaging the clutch members and revolving and stopping the two cutter shafts, a revoluble collar for each cam, an inclined flange on each collar engaging the stem of the cam, a driving disk having a notched and toothed periphery, a driving connection between the two disks, a continuously revoluble main driving shaft, a tooth on the continuously revoluble main driving shaft for engaging the notches of the driving disk, and means for driving the continuously revoluble main driving shaft, substantially as described.

40. In a machine for reeling and cutting off wire fence, the combination of an intermittently revoluble carrier, a detachable reel or spool mounted on the carrier, means for initially revolving the reel or spool, and means for continuing the revolving of the reel or spool and completing the winding of a length of fence on the reel or spool, substantially as described.

41. In a machine for reeling and cutting off wire fence, the combination of an intermittently revoluble carrier, a revoluble stub shaft on the carrier, an endwise movable stub shaft on the carrier, a reel or spool detachably mounted between the stub shafts, means for initially revolving the revoluble stub shaft, and means for continuing the revolving of the revoluble stub shaft and completing the winding of a length of fence on the reel or spool, substantially as described.

42. In a machine for reeling and cutting off wire fence, the combination of an intermittently revoluble carrier, a revoluble stub shaft on the carrier, an endwise movable stub shaft on the carrier, a reel or spool detachably mounted between the stub shafts, a pinion loosely mounted on the revoluble stub shaft, a fixed segmental rack engaged by the pinion, a connection between the pinion and revoluble stub shaft for initially revolving the revoluble stub shaft, and means for continuing the revolving of the revoluble stub shaft and completing the winding of a length of fence on the reel or spool, substantially as described.

43. In a machine for reeling and cutting off wire fence, the combination of an intermittently revoluble carrier, a revoluble stub shaft on the carrier, an endwise movable stub shaft on the carrier, a reel or spool detachably mounted between the stub shafts, a pinion loosely mounted on the revoluble stub shaft, a fixed segmental rack engaged by the pinion, a pawl revoluble with the pinion, a stop on the revoluble stub shaft engaged by the pawl for initially revolving the revoluble stub shaft, and means for continuing the revolving of the revoluble stub shaft and completing the winding of a length of fence on the reel or spool, substantially as described.

44. In a machine for reeling and cutting off wire fence, the combination of an intermittently revoluble carrier, a revoluble stub shaft on the carrier, an endwise movable stub shaft on the carrier, a reel or spool detachably mounted between the stub shafts, a pinion loosely mounted on the revoluble stub shaft, a fixed segmental rack engaged by the pinion, a connection between the pinion and revoluble stub shaft for initially revolving the revoluble stub shaft, a shoe connected with the pinion, a fixed track for the shoe, and means for continuing the revolving of the revoluble stub shaft and completing the winding of a length of fence on the reel or spool, substantially as described.

45. In a machine for reeling and cutting off wire fence, the combination of an intermittently revoluble carrier, a revoluble stub shaft on the carrier, an endwise movable stub shaft on the carrier, a reel or spool detachably mounted between the stub shafts, a pinion loosely mounted on the revoluble stub shaft, a fixed segmental rack engaged by the pinion, a pawl revoluble with the pinion, a stop on the revoluble stub shaft engaged by the pawl for initially revolving the revoluble stub shaft, a shoe connected with the pinion, a fixed track for the shoe, and means for continuing the revolving of the revoluble stub shaft and completing the winding of a length of fence on the reel or spool, substantially as described.

46. In a machine for reeling and cutting off wire fence, the combination of an intermittently revoluble carrier, a revoluble stub shaft on the carrier, an endwise movable stub shaft on the carrier, a reel or spool detachably mounted between the stub shafts, means for initially revolving the revoluble stub shaft, a continuously revoluble stub shaft, a slidable clutch member on the continuously revoluble stub shaft, a fixed clutch member on the revoluble stub shaft of the carrier, and means for engaging and disengaging the slidable clutch member with and from the fixed clutch member, substantially as described.

47. In a machine for reeling and cutting off wire fence, the combination of an intermittently revoluble carrier, a revoluble stub shaft on the carrier, an endwise movable stub shaft on the carrier, a reel or spool detachably mounted between the stub shafts, means for initially revolving the revoluble stub shaft, a continuously revoluble stub shaft, a slidable clutch member on the continuously revoluble stub shaft, a fixed clutch member on the revoluble stub shaft of the carrier, a forked lever engaged with the slidable member of the clutch, a link connected at one end with the forked lever, a vertically standing lever having the other end of the link connected therewith, and means for oscillating the vertically standing lever and engaging the clutch members of the stub shafts, substantially as described.

48. In a machine for reeling and cutting off wire fence, the combination of an intermittently revoluble carrier, a revoluble stub shaft on the carrier, an endwise movable stub shaft on the carrier, a reel or spool detachably mounted between the stub shafts, means for initially revolving the revoluble stub shaft, a continuously revoluble stub shaft, a slidable clutch member on the continuously revoluble stub shaft, a fixed clutch member on the revoluble stub shaft of the carrier, a forked lever engaged with the slidable member of the clutch, a link connected at one end with the forked lever, a vertically standing lever having the other end of the link connected therewith, a pin engaging the lower end of the vertically standing lever, and a revoluble gear carrying the pin for oscillating the vertically standing lever and engaging the clutch members of the stub shafts, substantially as described.

49. In a machine for reeling and cutting off wire fence, the combination of an intermittently revoluble carrier, a revoluble stub shaft on the carrier, an endwise movable stub shaft on the carrier, a reel or spool detachably mounted between the stub shafts, means for initially revolving the revoluble stub shaft, a continuously revoluble stub shaft, a slidable clutch member on the continuously revoluble stub shaft, a fixed clutch member on the revoluble stub shaft of the carrier, a forked lever engaged with the sliding member of the clutch, a horizontal lever connected with the forked lever, a revoluble disk having a notched and toothed periphery, a cam carried by the disk and engaging the end of the horizontal lever, and means for revolving the disk one tooth at a time, substantially as described.

50. In a machine for reeling and cutting off wire fence, the combination of an intermittently revoluble carrier, a revoluble stub shaft on the carrier, an endwise movable stub shaft on the carrier, a reel or spool detachably mounted between the stub shafts, means for initially revolving the revoluble stub shaft, a continuously revoluble stub shaft, a slidable clutch member on the continuously revoluble stub shaft, a fixed clutch member on the revoluble stub shaft of the carrier, a forked lever engaged with the sliding member of the clutch, a horizontal lever connected with the forked lever, a revoluble disk having a notched and toothed periphery, a cam carried by the disk and engaging the end of the horizontal lever, a continuously revoluble main driving shaft, and a tooth on the continuously revoluble main driving shaft engaging in succession the notches of the revoluble disk for moving the levers to disengage the clutch members, substantially as described.

51. A machine for reeling and cutting off wire fence, the combination of an intermittently revoluble carrier, a revoluble stub shaft on the carrier, an endwise movable stub shaft on the carrier, a reel or spool detachably mounted between the stub shafts, a pinion loosely mounted on the revoluble stub shaft, a fixed segmental rack engaged by the pinion, a pawl revoluble with the pinion, a stop on the revoluble stub shaft engaged by the pawl for initially revolving the revoluble stub shaft in raising the reel or spool from the lowermost forward position to the uppermost position, a continuously revoluble stub shaft, a clutch connection between the continuously revoluble stub shaft and the revoluble stub shaft of the carrier, and means for engaging and disengaging the clutch connection said clutch connection when in engagement enabling the continuously revoluble stub shaft to drive the revoluble stop of the carrier and complete the wind of a length of fence on the reel or spool, substantially as described.

52. In a machine for reeling and cutting off wire fence, the combination of an intermittently revoluble carrier, a revoluble stub shaft on the carrier, an endwise movable stub shaft on the carrier, a reel or spool detachably mounted between the stub shafts, a pinion loosely mounted on the revoluble stub shaft, a fixed segmental rack engaged by the pinion, a pawl revoluble with the pinion, a stop on the revoluble stub shaft engaged with the pawl for initially revolving the revoluble stub shaft in raising the reel or spool from the lowermost forward position to the uppermost position, a shoe connected with the pinion, a fixed track for the shoe, a continuously revoluble stub shaft, a clutch connection between the continuously revoluble stub shaft and the revoluble stub shaft of the carrier, and means for engaging and disengaging the clutch connection said clutch connection when in engagement enabling the continuously revoluble shaft to drive the revoluble shaft of the carrier and complete the wind of a length of fence on the reel or spool, substantially as described.

53. In a machine for reeling and cutting off wire fence, the combination of an intermittently revoluble carrier, a revoluble stub shaft on the carrier, an endwise movable stub shaft on the carrier, a reel or spool detachably mounted between the stub shafts, a pinion loosely mounted on the revoluble stub shaft, a fixed segmental rack engaged with the pinion, a pawl revoluble with the pinion, a stop on the revoluble stub shaft engaged by the pawl for initially revolving the revoluble stub shaft in raising the reel or spool from the lowermost forward position to the uppermost position, a fixed clutch member on the revoluble stub shaft of the carrier, a continuously revoluble stub shaft, a slidable clutch member on the continuously revoluble stub shaft, and means for moving the slidable clutch member and engaging and disengaging the clutch said clutch connection when in engagement enabling the continuously revoluble stub shaft to drive the revoluble stub shaft of the carrier and complete the wind of a length of fence on the reel or spool, substantially as described.

54. In a machine for reeling and cutting off wire fence, the combination of an intermittently revoluble carrier, a revoluble stub shaft on the carrier, an endwise movable stub shaft on the carrier, a reel or spool detachably mounted between the stub shafts, a pinion loosely mounted on the revoluble stub shaft, a fixed segmental rack engaged with the pinion, a pawl revoluble with the pinion, a stop on the revoluble stub shaft engaged by the pawl for initially revolving the revoluble stub shaft in raising the reel or spool from the lowermost forward position to the uppermost position, a fixed clutch member on the revoluble stub shaft of the carrier, a continuously revoluble stub shaft, a slidable clutch member on the continuously revoluble stub shaft, a forked lever engaged with the slidable member of the clutch, a link connected at one end to the forked lever, a vertically standing lever having the other end of the link connected therewith, a pin engaging the lower end of the vertically standing lever, and a revoluble gear carrying the pin for oscillating the vertically standing lever and engaging the clutch members to revolve the reel or spool, substantially as described.

55. In a machine for reeling and cutting off wire fence, the combination of an intermittently revoluble carrier, a revoluble stub shaft on the carrier, an endwise movable stub shaft on the carrier, a reel or spool detachably mounted between the stub shafts, a pinion loosely mounted on the revoluble stub shaft, a fixed segmental rack engaged with the pinion, a pawl revoluble with the pinion, a stop on the revoluble stub shaft engaged by the pawl for initially revolving the revoluble stub shaft in raising the reel or spool from the lowermost forward position to the uppermost position, a fixed clutch member on the revoluble stub shaft of the carrier, a continuously revoluble stub shaft, a slidable clutch member on the continuously revoluble stub shaft, a forked lever engaged with the slidable member of the clutch, a link connected at one end to the forked lever, a vertically standing lever having the other end of the link connected therewith, a pin engaging the lower end of the vertically standing lever, a revoluble gear carrying the pin for oscillating the vertically standing lever and engaging the clutch members to revolve the reel or spool, a horizontal lever connected with the forked lever of the slidable clutch member, a revoluble disk having a notched and toothed periphery, a cam carried by the disk and engaging the end of the horizontal lever, and means for revolving the disk one tooth at a time and moving both levers to disengage the clutch member, substantially as described.

56. In a machine for reeling and cutting off wire fence, the combination of an intermittently revoluble carrier, a revoluble stub shaft on the carrier, an endwise movable stub shaft on the carrier, a reel or spool detachably mounted between the stub shafts, a pinion loosely mounted on the revoluble stub shaft, a fixed segmental rack engaged with the pinion, a pawl revoluble with the pinion, a stop on the revoluble stub shaft engaged by the pawl for initially revolving the revoluble stub shaft in raising the reel or spool from the lowermost forward position to the uppermost position, a fixed clutch member on the revoluble stub shaft of the carrier, a continuously revoluble stub shaft, a slidable clutch member on the continuously revoluble stub shaft, a forked lever engaged with the slidable member of the clutch, a link connected at one end to the forked lever, a vertically standing lever having the other end of the link connected therewith, a pin engaging the lower end of the vertically standing lever, a revoluble gear carrying the pin for oscillating the vertically standing lever and engaging the clutch members to revolve the reel or spool, a horizontal lever connected with the forked lever of the slidable clutch member, a revoluble disk having a notched and toothed periphery, a cam carried by the disk and engaging the end of the horizontal lever, a continuously revoluble main driving shaft, and a tooth on the continuously revoluble main driving shaft engaging in succession the notches of the disk for moving the levers to disengage the clutch members, substantially as described.

57. In a machine for reeling and cutting off wire fence, the combination of an intermittently revoluble carrier, a plurality of reels or spools, each reel or spool detachably mounted on the carrier, means for initially revolving each reel or spool, and means for continuing the revolving of each reel or spool and completing the wind of a length of fence on the reel or spool, substantially as described.

58. In a machine for reeling and cutting off wire fence, the combination of an intermittently revoluble carrier, a plurality of revoluble stub shafts on the carrier, a plurality of endwise movable stub shafts on the carrier, a reel or spool detachably mounted between each pair of revoluble stub shafts and endwise movable stub shafts, means for initially revolving each revoluble stub shaft, and means for continuing the revolving of each revoluble stub shaft and completing the wind of the length of fence on the reel or spool, substantially as described.

59. In a machine for reeling and cutting off wire fence, the combination of an intermittently revoluble carrier, a plurality of revoluble stub shafts on the carrier, a plurality of endwise movable stub shafts on the carrier, a reel or spool detachably mounted between each revoluble and endwise movable stub shaft, a pinion loosely mounted on each revoluble stub shaft, a fixed segmental rack engaged by each pinion in succession, a pawl revoluble with each pinion, a stop on each revoluble stub shaft engaged by the pawl of the pinion for initially revolving each revoluble stub shaft in raising the reel or spool from the lowermost position to the uppermost position, and means for continuing the revolving of each revoluble stub shaft and completing the wind of a length of fence on the reel or spool, substantially as described.

60. In a machine for reeling and cutting off wire fence, the combination of an intermittently revoluble carrier, a plurality of revoluble stub shafts on the carrier, a plurality of endwise movable stub shafts on the carrier, a reel or spool detachably mounted between each revoluble and endwise movable stub shaft, a pinion loosely mounted on each revoluble stub shaft, a fixed segmental rack engaged by each pinion in succession, a pawl revoluble with each pinion, a stop on each revoluble stub shaft engaged by the pawl of the pinion for initially revolving each revoluble stub shaft in raising the reel or spool from the lowermost position to the uppermost position, a shoe connected with the pinion, a fixed track for the shoe, and means for continuing the revolving of each revoluble stub shaft and completing the wind of a length of fence on the reel or spool, substantially as described.

61. In a machine for reeling and cutting off wire fence, the combination of an intermittently revoluble carrier, a plurality of revoluble stub shafts on the carrier, a plurality of endwise movable stub shafts on the carrier, a reel or spool detachably mounted between each revoluble and endwise movable stub shaft, a pinion loosely mounted on each revoluble stub shaft, a fixed segmental rack engaged by each pinion in succession, a pawl revoluble with each pinion, a stop on each revoluble stub shaft engaged by the pawl of the pinion for initially revolving each revoluble stub shaft in raising the reel or spool from the lowermost position to the uppermost position, a fixed clutch member on each revoluble stub shaft, a continuously revoluble stub shaft common to all of the revoluble stub shafts of the carrier, a slidable clutch member on the continuously revoluble stub shaft, and means for engaging and disengaging the slidable clutch member with and from the fixed clutch member of each revoluble stub shaft of the carrier and completing the wind of a length of fence on the reel or spool, substantially as described.

62. In a machine for reeling and cutting off wire fence, the combination of an intermittently revoluble carrier, a plurality of revoluble stub shafts on the carrier, a plurality of endwise movable stub shafts on the carrier, a reel or spool detachably mounted between each revoluble and endwise movable stub shaft, a pinion loosely mounted on each revoluble stub shaft, a fixed segmental rack engaged by each pinion in succession, a pawl revoluble with each pinion, a stop on each revoluble stub shaft engaged by the pawl of the pinion for initially revolving each revoluble stub shaft in raising the reel or spool from the lowermost position to the uppermost position, a shoe connected with the pinion and a fixed track for the shoe, a fixed clutch member on each revoluble stub shaft of the carrier, a continuously revoluble stub shaft common to all of the revoluble stub shafts of the carrier, a slidable clutch member on the continuously revoluble stub shaft, and means for engaging and disengaging the slidable clutch with and from the fixed clutch member of each revoluble shaft of the carrier and when said clutch members are in engagement allow of the winding of a length of fence on each reel or spool, substantially as described.

63. In a machine for reeling and cutting off wire fence, the combination of an intermittently revoluble carrier, a plurality of revoluble stub shafts on the carrier, a plurality of endwise movable stub shafts on the carrier, a reel or spool detachably mounted between each revoluble and endwise movable stub shaft, a pinion loosely mounted on each revoluble stub shaft, a fixed segmental rack engaged by each pinion in succession, a pawl revoluble with each pinion, a stop on each revoluble stub shaft engaged by the pawl of the pinion for initially revolving each revoluble stub shaft in raising the reel or spool from the lowermost position to the uppermost position, a fixed clutch member on each revoluble stub shaft, a continuously revoluble stub shaft common to all of the revoluble stub shafts of the carrier, a slidable clutch member on the continuously revoluble stub shaft, a forked lever engaged with the slidable member of the clutch, a link connected at one end of the forked lever, a vertically standing lever having the other end of the link connected therewith, a pin engaging the lower end of the vertically standing lever, and a revoluble gear carrying the pin for oscillating the vertically standing lever and moving the sliding member of the clutch into engagement with the fixed member, substantially as described.

64. In a machine for reeling and cutting off wire fence, the combination of an intermittently revoluble carrier, a plurality of revoluble stub shafts on the carrier, a plurality of endwise movable stub shafts on the carrier, a reel or spool detachably mounted between each revoluble and endwise movable stub shaft, a pinion loosely mounted on each revoluble stub shaft, a fixed segmental rack engaged by each pinion in succession, a pawl revoluble with each pinion, a stop on each revoluble stub shaft engaged by the pawl of the pinion for initially revolving each revoluble stub shaft in raising the reel or spool from the lowermost position to the uppermost position, a fixed clutch member on each revoluble stub shaft, a continuously revoluble stub shaft common to all of the revoluble stub shafts of the carrier, a slidable clutch member on the continuously revoluble stub shaft, a forked lever engaged with the sliding member of the clutch, a horizontal lever connected with the forked lever, a revoluble disk having a notched and toothed periphery, a cam carried by the disk engaging the end of the horizontal lever, and means for revolving the disk one tooth at a time and moving both levers to disengage the clutch member and stop the revolving of each reel or spool, substantially as described.

65. In a machine for reeling and cutting off wire fence, the combination of an intermittently revoluble carrier, a plurality of revoluble stub shafts on the carrier, a plurality of endwise movable stub shafts on the carrier, a reel or spool detachably mounted between each revoluble and endwise movable stub shaft, a pinion loosely mounted on each revoluble stub shaft, a fixed segmental rack engaged by each pinion in succession, a pawl revoluble with each pinion, a stop on each revoluble stub shaft engaged by the pawl of the pinion for initially revolving each revoluble stub shaft in raising the reel or spool from the lowermost position to the uppermost position, a fixed clutch member on each revoluble stub shaft, a continuously revoluble stub shaft common to all of the revoluble stub shafts of the carrier, a slidable clutch member on the continuously revoluble stub shaft, a forked lever engaged with the sliding member of the clutch, a horizontal lever connected with the forked lever, a revoluble disk having a notched and toothed periphery, a cam carried by the disk engaging the end of the horizontal lever, a continuously revoluble main driving shaft, and a tooth on the continuously revoluble main driving shaft engaging in succession the notches of the disk for moving both levers to disengage the clutch member, substantially as described.

66. In a machine for reeling and cutting off wire fence, the combination of an intermittently revoluble carrier, a plurality of revoluble stub shafts on the carrier, a plurality of endwise movable stub shafts on the carrier, a reel or spool detachably mounted between each revoluble and endwise movable stub shaft, a pinion loosely mounted on each revoluble stub shaft, a fixed segmental rack engaged by each pinion in succession, a pawl revoluble with each pinion, a stop on each revoluble stub shaft engaged by the pawl of the pinion for initially revolving each revoluble stub shaft in raising the reel or spool from the lowermost position to the uppermost position, a shoe connected with the pinion, a fixed track for the shoe, a fixed clutch member on each revoluble stub shaft of the carrier, a continuously revoluble stub shaft common to all of the revoluble stub shafts of the carrier, a slidable clutch member on the continuously revoluble stub shaft, means for engaging the slidable clutch member with the fixed clutch member of each revoluble shaft of the carrier and when said clutch members are in engagement allow of the winding of a length of fence on each reel or spool, a horizontal lever connected with the forked lever, a revoluble disk having a notched and toothed periphery, a cam carried by the disk and engaging the end of the horizontal lever, and means for revolving the disk one tooth at a time for moving both levers to disengage the clutch member, substantially as described.

67. In a machine for reeling and cutting off wire fence, the combination of an intermittently revoluble carrier, a plurality of revoluble stub shafts on the carrier, a plurality of endwise movable stub shafts on the carrier, a reel or spool detachably mounted between each revoluble and endwise movable stub shaft, a pinion loosely mounted on each revoluble stub shaft, a fixed segmental rack engaged by each pinion in succession, a pawl revoluble with each pinion, a stop on each revoluble stub shaft engaged by the pawl of the pinion for initially revolving each revoluble stub shaft in raising the reel or spool from the lowermost position to the uppermost position, a shoe connected with the pinion, a fixed track for the shoe, a fixed clutch member on each revoluble stub shaft of the carrier, a continuously revoluble stub shaft common to all of the revoluble stub shafts of the carrier, a slidable clutch member on the continuously revoluble stub shaft, means for engaging the slidable clutch member with the fixed clutch member of each revoluble shaft of the carrier and when said clutch members are in engagement allow of the winding of a length of fence on each reel or spool, a horizontal lever connected with the forked lever, a revoluble disk having a notched and toothed periphery, a cam carried by the disk and engaging the end of the horizontal lever, a continuously revoluble main driving shaft, and a tooth on the continuously revoluble main driving shaft engaging in succession the notches of the disk for moving both levers to disengage the clutch members, substantially as described.

68. In a machine for reeling and cutting off wire fence, the combination of a pair of intermittently revoluble gears constituting an intermittently revoluble carrier, a detachable reel or spool mounted on the carrier, a pair of driven pinions, one pinion for each carrier gear, a pair of driving pinions, one pinion for each driven pinion, an intermittently revoluble driven shaft having the driving pinions thereon, and means for driving the intermittently revoluble driven shaft and giving an intermittent revolution to the carrier gears, substantially as described.

69. In a machine for reeling and cutting off wire fence, the combination of a pair of intermittently revoluble gears constituting an intermittently revoluble carrier, a detachable reel or spool mounted on the carrier, a pair of driven pinions, one pinion for each carrier gear, a pair of driving pinions, one pinion for each driven pinion, an intermittently revoluble driven shaft having the driving pinions thereon, a divided driven shaft, a gear connection between the revoluble driven shaft and the divided driven shaft, a clutch connection for the divided driven shaft, and means for driving the divided driven shaft and giving an intermittent revolution to the carrier gears, substantially as described.

70. In a machine for reeling and cutting off wire fence, the combination of a pair of intermittently revoluble gears constituting an intermittently revoluble carrier, a detachable reel or spool mounted on the carrier, a pair of driven pinions, one pinion for each carrier gear, a pair of driving pinions, one pinion for each driven pinion, an intermittently revoluble driven shaft having the driving pinions thereon, a divided driven shaft, a gear connection between the revoluble driven shaft and the divided driven shaft, a clutch connection for the divided driven shaft, an intermittently revoluble driving shaft, a gear connection between the intermittently revoluble driving shaft and the divided driven shaft, and means for driving the intermittently revoluble driving shaft and giving an intermittent revolution to the carrier gears, substantially as described.

71. In a machine for reeling and cutting off wire fence, the combination of a pair of intermittently revoluble gears constituting an intermittently revoluble carrier, a detachable reel or spool mounted on the carrier, a pair of driven pinions, one pinion for each carrier gear, a pair of driving pinions, one pinion for each driven pinion, an intermittently revoluble driven shaft having the driving pinions thereon, a divided driven shaft, having the driving pinions thereon, a divided driven shaft, a gear connection between the revoluble driven shaft and the divided driven shaft, a clutch connection for the divided driven shaft, an intermittently revoluble driving shaft, a gear connection between the intermittently revoluble driving shaft and the divided driven shaft, a revoluble disk having a notched and toothed periphery and mounted on the intermittently revoluble driving shaft, and means for revolving the disk and giving an intermittent revolution to the carrier gears, substantially as described.

72. In a machine for reeling and cutting off wire fence, the combination of a pair of intermittently revoluble gears constituting an intermittently revoluble carrier, a detachable reel or spool mounted on the carrier, a pair of driving pinions, one pinion for each driven pinion, an intermittently revoluble driven shaft having the driving pinions thereon, a divided driven shaft, a gear connection between the revoluble driven shaft and the divided driven shaft, a clutch connection for the divided driven shaft, an intermittently revoluble driving shaft, a gear connection between the intermittently revoluble driving shaft and the divided driven shaft, a revoluble disk having a notched and toothed periphery and mounted on the intermittently revoluble driving shaft, a continuously revolving main driving shaft, and a tooth on the continuously revolving main driving shaft engaging the notches of the disk and giving an intermittent revolution to the carrier gears, substantially as described.

73. In a machine for reeling and cutting off wire fence, the combination of a pair of intermittently revoluble gears constituting an intermittently revoluble carrier, a detachable reel or spool mounted on the carrier, a pair of driving pinions, one pinion for each driven pinion, an intermittently revoluble driven shaft having the driving pinions thereon, a divided driven shaft, a gear connection between the revoluble driven shaft and the divided driven shaft, a clutch connection for the divided driven shaft, an intermittently revoluble driving shaft, a gear connection between the intermittently revoluble driving shaft and the divided driven shaft, a revoluble disk having a notched and toothed periphery and mounted on the intermittently revoluble driving shaft, a continuously revolving main driving shaft, and a tooth on the continuously revolving main driving shaft engaging the notches of the disk, and means for driving the continuously revolving main driving shaft and giving an intermittent revolution to the carrier gears, substantially as described.

74. In a machine for reeling and cutting off wire fence, the combination of a pair of intermittently revoluble gears, constituting an intermittently revoluble carrier, a detachable reel or spool mounted on the carrier, a pair of driven pinions, one pinion for each carrier gear, a pair of driving pinions, one pinion for each driven pinion, an intermittently revoluble driven shaft having the driving pinions thereon, a divided driven shaft, a gear connection between the revoluble driven shaft and the divided driven shaft, a slidable clutch member on one section of the divided driven shaft, a fixed clutch member on the other section of the divided driven shaft, and means for engaging and disengaging the clutch members and starting and stopping the revolution of the carrier gears, substantially as described.

75. In a machine for reeling and cutting off wire fence, the combination of a pair of intermittently revoluble gears, constituting an intermittently revoluble carrier, a detachable reel or spool mounted on the carrier, a pair of driven pinions, one pinion for each carrier gear, a pair of driving pinions, one pinion for each driven pinion, an intermittently revoluble driven shaft having the driving pinions thereon, a divided driven shaft, a gear connection between the revoluble driven shaft and the divided driven shaft, a slidable clutch member on one section of the divided driven shaft, a fixed clutch member on the other section of the divided driven shaft, a lever connected with the slidable member of the clutch, a link connected at one end with the lever, a bell-crank lever connected with the other end of the link, and a revoluble disk engaging the bell-crank lever for moving the slidable member of the clutch into engagement with the fixed member and starting the revolution of the carrier gears, substantially as described.

76. In a machine for reeling and cutting off wire fence, the combination of a pair of intermittently revoluble gears, constituting an intermittently revoluble carrier, a detachable reel or spool mounted on the carrier, a pair of driven pinions one pinion for each carrier gear, a pair of driving pinions, one pinion for each driven pinion, an intermittently revoluble driven shaft having the driving pinions thereon, a divided driven shaft, a gear connection between the revoluble driven shaft and the divided driven shaft, a slidable clutch member on one section of the divided driven shaft, a fixed clutch member on the other section of the divided driven shaft, a lever connected with the slidable member of the clutch, a link connected at one end with the lever, a bell-crank lever connected with the other end of the link, a revoluble disk, and engaging the bell-crank lever for moving the slidable member of the clutch into engagement with the movable member of the clutch and starting the revolution of the carrier gears, substantially as described.

77. In a machine for reeling and cutting off wire fence, the combination of a pair of intermittently revoluble gears, constituting an intermittently revoluble carrier, a detachable reel or spool mounted on the carrier, a pair of driven pinions, one pinion for each carrier gear, a pair of driving pinions, one pinion for each driven pinion, an intermittently revoluble driven shaft having the driving pinions thereon, a divided driven shaft, a gear connection between the revoluble driven shaft and the divided driven shaft, a slidable clutch member on one section of the divided driven shaft, a fixed clutch member on the other section of the divided driven shaft, a lever connected with the slidable member of the clutch, a link connected at one end with the lever, a bell-crank lever connected with the other end of the link, a revoluble disk having a notched and toothed periphery, a cam carried by the disk for engaging the bell-crank lever and moving the sliding member of the clutch into engagement with the fixed member of the clutch and starting the revolution of the carrier gears, and means for revolving the notched and toothed disk one tooth at a time, substantially as described.

78. In a machine for reeling and cutting off wire fence, the combination of a pair of intermittently revoluble gears, constituting an intermittently revoluble carrier, a detachable reel or spool mounted on the carrier, a pair of driven pinions, one pinion for each carrier gear, a pair of driving pinions, one pinion for each driven pinion, an intermittently revoluble driven shaft having the driving pinions thereon, a divided driven shaft, a gear connection between the revoluble driven shaft and the divided driven shaft, a slidable clutch member on one section of the divided driven shaft, a fixed clutch member on the other section of the divided driven shaft, a lever connected with the slidable member of the clutch, a link connected at one end with the lever, a bell-crank lever connected with the other end of the link, a revoluble disk having a notched and toothed periphery, a cam carried by the disk for engaging the bell-crank lever and moving the sliding member of the clutch into engagement with the fixed member of the clutch and starting the revolution of the carrier gears, a continuously revoluble main driving shaft, and a tooth on the continuously revoluble main driving shaft engaging the notches of the disk, substantially as described.

79. In a machine for reeling and cutting off wire fence, the combination of a pair of intermittently revoluble gears, constituting an intermittently revoluble carrier, a detachable reel or spool mounted on the carrier, a pair of driven pinions, one pinion for each carrier gear, a pair of driving pinions, one pinion for each driven pinion, an intermittently revoluble driven shaft having the driving pinions thereon, a divided driven shaft, a gear connection between the revoluble driven shaft and the divided driven shaft, a slidable clutch member on one section of the divided driven shaft, a fixed clutch member on the other section of the divided driven shaft, a lever connected with the slidable member of the clutch, a link connected at one end with the lever, a bell-crank lever connected with the other end of the link, a revoluble disk having a notched and toothed periphery, a cam carried by the disk for engaging the bell-crank lever and moving the sliding member of the clutch into engagement with the fixed member of the clutch and starting the revolution of the carrier gears, a continuously revoluble main driving shaft, a tooth on the continuously revoluble main driving shaft engaging the notches of the disk, and means for continuously revolving the main driving shaft, substantially as described.

80. In a machine for reeling and cutting off wire fence, the combination of a pair of intermittently revoluble gears constituting an intermittently revoluble carrier, a detachable reel or spool mounted on the carrier, a pair of driven pinions, one pinion for each carrier gear, a pair of driving pinions, one pinion for each driven pinion, an intermittently revoluble driven shaft having the driving pinions thereon, a divided driven shaft, a gear connection between the revoluble driven shafts and the divided driven shaft, a slidable clutch member on one section of the divided driven shaft, a fixed clutch member on the other section of the divided driven shaft, means for moving the slidable clutch member into engagement with the fixed clutch member of the clutch, and means for moving the slidable clutch member from engagement with the fixed clutch member of the clutch for revolving and stopping the revolution of the carrier gears, substantially as described.

81. In a machine for reeling and cutting off wire fence, the combination of a pair of intermittently revoluble gears constituting an intermittently revoluble carrier, a detachable reel or spool mounted on the carrier, a pair of driven pinions, one pinion for each carrier gear, a pair of driving pinions, one pinion for each driven pinion, an intermittently revoluble driven shaft having the driving pinions thereon, a divided driven shaft, a gear connection between the revoluble driven shafts and the divided driven shaft, a slidable clutch member on one section of the divided driven shaft, a fixed clutch member on the other section of the divided driven shaft, a lever connected with the slidable member of the clutch, a link connected at one end with the lever, a bell-crank lever connected with the other end of the link, a revoluble disk having a notched and toothed periphery, a cam carried by the disk for engaging the bell-crank lever and moving the sliding member of the clutch into engagement with the fixed member of the clutch for driving the carrier gears, and means for disengaging the slidable clutch member from the fixed clutch member of the clutch for stopping the revolution of the carrier gears, substantially as described.

82. In a machine for reeling and cutting off wire fence, the combination of a pair of intermittently revoluble gears constituting an intermittently revoluble carrier, a detachable reel or spool mounted on the carrier, a pair of driven pinions, one pinion for each carrier gear, a pair of driving pinions, one pinion for each driven pinion, an intermittently revoluble driven shaft having the driving pinions thereon, a divided driven shaft, a gear connection between the revoluble driven shafts and the divided driven shaft, a slidable clutch member on one section of the divided driven shaft, a fixed clutch member on the other section of the divided driven shaft, means for moving the slidable clutch member into engagement with the fixed clutch member of the clutch, a pinion on the fixed member of the clutch and revoluble therewith, a revoluble gear engaged by the pinion, a cam on the revoluble gear, and an arm on the movable member of the clutch for disengaging the clutch member and stopping the revolving of the carrier gears, substantially as described.

83. In a machine for reeling and cutting off wire fence, the combination of a pair of intermittently revoluble gears constituting an intermittently revoluble carrier, a detachable reel or spool mounted on the carrier, a pair of driven pinions, one pinion for each carrier gear, a pair of driving pinions, one pinion for each driven pinion, an intermittently revoluble driven shaft having the driving pinions thereon, a divided driven shaft, a gear connection between the revoluble driven shafts and the divided driven shaft, a slidable clutch member on one section of the divided driven shaft, a fixed clutch member on the other section of the divided driven shaft, a lever connected with the slidable member of the clutch, a link connected at one end with the lever, a bell-crank lever connected with the other end of the link, a revoluble disk having a notched and toothed periphery, a cam carried by the disk for engaging the bell-crank lever and moving the sliding member of the clutch into engagement with the fixed member of the clutch for driving the carrier gears, a pinion on the fixed member of the clutch and revolving therewith, a revoluble gear engaged by the pinion, a cam on the revoluble gear, and an arm on the movable member of the clutch for disengaging the clutch member and stopping the revolving of the carrier gears, substantially as described.

84. In a machine for reeling and cutting off wire fence, the combination of a pair of intermittently revoluble gears constituting an intermittently revoluble carrier, a revoluble stub shaft on one gear, an endwise movable stub shaft on the other gear, a reel or spool detachably mounted between the two stub shafts, a continuously revoluble stub shaft, a clutch connection between the two stub shafts, a forked lever connected with the movable member of the clutch, a link connected to one end of the forked lever, a vertically standing lever having the other end of the link connected thereto, a divided driven shaft, a gear connection between the divided driven shaft and the revoluble gears of the carrier, a clutch connection for the divided driven shaft, means for engaging and disengaging the clutch connection of the divided driven shaft for revolving and stopping the revolution of the carrier gears, and means operated by the clutch connection of the divided driven shaft for oscillating the forked lever of the clutch for the two stub shafts and engaging the members of said clutch and completing the revolving of the reel or spool for the wind of a length of fence onto the reel or spool, substantially as described.

85. In a machine for reeling and cutting off wire fence, the combination of a pair of intermittently revoluble cutters each consisting of a plurality of blades corresponding to the number of longitudinal or strand wires of the fence, means for revolving the cutters a single revolution at regular intervals for the blades to act and sever a predetermined length of fence from the main body thereof, and automatically actuating means for the means for revolving the cutters, substantially as described.

86. In a machine for reeling and cutting off wire fence, the combination of a pair of intermittently revoluble cutters each consisting of a plurality of blades corresponding to the number of longitudinal or strand wires of the fence, means for revolving the cutters a single revolution at regular intervals for the blades to act and sever a predetermined length of fence from the main body thereof, automatically actuating means for the means for revolving the cutters, an intermittently revoluble carrier, a detachable reel or spool mounted on the carrier and adapted for winding thereon the length of severed fence, means for intermittently revolving the carrier, and means for automatically actuating the revolving means for the carrier, substantially as described.

87. In a machine for reeling and cutting off wire fence, the combination of a pair of intermittently revoluble cutters each consisting of a plurality of blades corresponding to the number of longitudinal or strand wires of the fence, means for revolving the cutters a single revolution at regular intervals for the blades to act and sever a predetermined length of fence from the main body thereof, automatically actuating means for the means for revolving the cutters, an intermittently revoluble carrier, a detachable reel or spool mounted on the carrier and adapted for winding thereon the length of severed fence, means for intermittently revolving the carrier, means for automatically actuating the revolving means for the carrier, means for initially revolving the reel or spool in raising the reel or spool from the lowermost forward position to the uppermost position, means for revolving the reel or spool in the uppermost position and completing the wind of the severed length of fence on the reel or spool, and means for automatically actuating the revolving means for the reel or spool in the uppermost position, substantially as described.

88. In a machine for reeling and cutting off wire fence, the combination of a pair of intermittently revoluble cutters each consisting of a plurality of blades corresponding to the number of longitudinal or strand wires of the fence, means for revolving the cutters a single revolution at regular intervals for the blades to act and sever a predetermined length of fence from the main body thereof, automatically actuating means for the means for revolving the cutters, an intermittently revoluble carrier, a plurality of reels or spools mounted on the carrier, each reel or spool adapted for winding thereon a length of severed fence, means for initially revolving each reel or spool in raising from the lowermost forward position to the uppermost position, and means for automatically actuating the means for initially revolving each reel or spool, substantially as described.

89. In a machine for reeling and cutting off wire fence, the combination of a pair of intermittently revoluble cutters each consisting of a plurality of blades corresponding to the number of longitudinal or strand wires of the fence, means for revolving the cutters a single revolution at regular intervals for the blades to act and sever a predetermined length of fence from the main body thereof, automatically actuating means for the means for revolving the cutters, an intermittently revoluble carrier, a plurality of reels or spools mounted on the carrier, each reel or spool adapted for winding thereon a length of severed fence, means for initially revolving each reel or spool in raising from the lowermost forward position to the uppermost position, means for automatically actuating the means for initially revolving each reel or spool, means for revolving each reel or spool in its uppermost position and completing the wind of the severed length of fence on each reel or spool, and means for automatically actuating the revolving means for each reel or spool in its uppermost position, substantially as described.

90. In a machine for reeling and cutting off wire fence, the combination of a pair of intermittently revoluble cutters each consisting of a plurality of blades corresponding to the number of longitudinal or strand wires of the fence, means for revolving the cutters a single revolution at regular intervals for the blades to act and sever a predetermined length of fence from the main body thereof, an intermittently revoluble carrier, a detachable reel or spool mounted on the carrier and adapted for winding thereon the length of severed fence, means for initially revolving the reel or spool in raising the reel or spool from the lowermost forward position to the uppermost position, means for continuing the revolving of the reel or spool in its uppermost position, and means operating with the passage of a predetermined length of fence through the cutters and causing the driving means for the cutters to operate, substantially as described.

91. In a machine for reeling and cutting off wire fence, the combination of a pair of intermittently revoluble cutters each consisting of a plurality of blades corresponding to the number of longitudinal or strand wires of the fence, means for revolving the cutters a single revolution at regular intervals for the blades to act and sever a predetermined length of fence from the main body thereof, an intermittently revoluble carrier, a detachable reel or spool mounted on the carrier and adapted for winding thereon the length of severed fence, means for initially revolving the reel or spool in raising the reel or spool from the lowermost forward position to the uppermost position, means for continuing the revolving of the reel or spool in its uppermost position, means operating with the passage of a predetermined length of fence through the cutters and causing the driving means for the cutters to operate, and means operating in correlation with the actuating means for causing the driving means for the cutters to act and starting and stopping the revolution of the carrier, substantially as described.

JOSEPH M. DENNING.

Witnesses:
 OSCAR W. BOND,
 WALKER BANNING.